United States Patent
Spencer et al.

[11] Patent Number: 5,982,596
[45] Date of Patent: Nov. 9, 1999

[54] LOAD CENTER MONITOR AND DIGITALLY ENHANCED CIRCUIT BREAKER SYSTEM FOR MONITORING ELECTRICAL POWER LINES

[75] Inventors: George Auther Spencer, Plano; LeRoy Blanton, Garland; Robert Henry Clunn, Richardson, all of Tex.

[73] Assignee: George Authur Spencer, Plano, Tex.

[21] Appl. No.: 09/073,379

[22] Filed: May 5, 1998

[51] Int. Cl.⁶ ................................................ H02H 3/00
[52] U.S. Cl. ........................................ 361/64; 361/102
[58] Field of Search ........................... 361/62–68, 93–94, 361/96–97, 99, 102; 702/58, 64

[56] References Cited

U.S. PATENT DOCUMENTS

| | | | |
|---|---|---|---|
| 4,949,214 | 8/1990 | Spencer | 361/95 |
| 5,038,246 | 8/1991 | Durivage, III | 361/93 |
| 5,301,083 | 4/1994 | Grass et al. | 361/64 |
| 5,373,411 | 12/1994 | Grass et al. | 361/64 |
| 5,384,678 | 1/1995 | Ebersohl et al. | 361/62 |
| 5,452,223 | 9/1995 | Zuercher et al. | 364/483 |
| 5,510,945 | 4/1996 | Taylor et al. | 361/45 |
| 5,510,946 | 4/1996 | Franklin | 361/56 |
| 5,546,266 | 8/1996 | Mackenzie et al. | 361/93 |
| 5,590,012 | 12/1996 | Dollar, II | 361/113 |
| 5,666,256 | 9/1997 | Zavis et al. | 361/115 |
| 5,701,226 | 12/1997 | Gelbien et al. | 361/63 |
| 5,706,159 | 1/1998 | Dollar, II et al. | 361/113 |
| 5,862,101 | 10/1997 | Brooks et al. | 324/536 |
| 5,875,087 | 2/1999 | Spencer et al. | 361/87 |

Primary Examiner—Michael J. Sherry
Attorney, Agent, or Firm—Gregory M. Howison; Stephen S. Mosher

[57] ABSTRACT

A system including a load center monitor (10) connected to a plurality of digitally enhanced circuit breakers (40) by a communication bus (26) provides monitoring and control of an electrical power distribution system. A user port (20) and a service port (22) provide a communication interface with an external computer. Visual indicators (34) and an audible alarm (30) provide for alerting persons to certain conditions in the system. Buttons are provided for CLEAR (38) and RESET (36) functions, and a diagnostic port (24) is also provided. The load center monitor (10) is operable to monitor the operation of the breakers (40) and download information therefrom in the form of historical data. Also, the load center monitor (10) can upload operating information to a breaker (40) in order to change the operation thereof.

18 Claims, 9 Drawing Sheets

LOAD CENTER MONITOR AND DIGITALLY ENHANCED CIRCUIT BREAKER SYSTEM FOR MONITORING ELECTRICAL POWER LINES

CROSS-REFERENCE TO RELATED APPLICATION

This application is related to U.S. Pat. No. 5,875,087 issued Feb. 22, 1999 entitled "CIRCUIT BREAKER WITH INTEGRATED CONTROL FEATURES" (Attorney Docket ZLAN-23,804); and is related to U.S. Pat. No. 4,949,214 issued Aug. 14, 1990 to George A. Spencer, entitled "TRIP DELAY OVERRIDE FOR ELECTRICAL CIRCUIT BREAKERS".

TECHNICAL FIELD OF THE INVENTION

The present invention pertains in general to circuit breakers and, more particularly, to a load center monitor in a network of electronically controlled circuit breakers for providing monitoring, analysis and control of circuit breaker function.

BACKGROUND OF THE INVENTION

In a typical AC power distribution system in a residential or small business building, an array of electromechanical circuit breakers protects various branch circuits of the electrical wiring. Such circuit breakers utilize a thermally operated switch which, upon reaching a predetermined temperature due to excessive current passing therethrough, will "trip" and open the circuit connected to the switch.

Improved circuit breakers are disclosed in U.S. Pat. No. 4,949,214, entitled "TRIP DELAY OVERRIDE FOR ELECTRICAL CIRCUIT BREAKERS" issued to George A. Spencer on Aug. 14, 1990, an assignee of the present U.S. patent application, and in U.S. Pat. No. 5,875,087 issued Feb. 22, 1999 entitled "CIRCUIT BREAKERS WITH INTEGRATED CONTROL FEATURES", by the inventors of the present application on Aug. 8, 1996 and assigned to the assignee of the present application, which patents are incorporated herein by reference. The improved circuit breakers disclosed therein include an array of trip profiles tailored to the current draw characteristics of the various kinds of devices which may be connected to the AC power line branch circuit protected by the circuit breaker. These trip profiles, which are dynamically changeable, determine the current versus time configuration of the particular circuit breaker. Such improved circuit breakers overcome the principal disadvantages of the conventional thermally operated circuit breakers, including, for example, slow response time, inability of responding to differing in-rush current characteristics, inability of opening a circuit upon the occurrence of arcing (a potentially serious fire hazard), inadequate response to electrical stalling of motors connected to a protected line, etc.

Although the circuit breakers with trip delay override and the electronically controlled circuit breakers with integrated control features referenced above and hereinbelow as digitally enhanced circuit breakers, offer superior trip performance under a variety of load fault conditions, several significant new features and capabilities, if provided in conjunction with such advanced circuit breakers, would overcome the following shortcomings. Neither of the aforementioned advanced circuit breakers has the capability of storing substantial quantities of system data, for example in a high capacity, non-volatile memory, when a total power failure occurs. Moreover, the performance of an individual digitally enhanced circuit breaker (DE breaker) is monitored only by the internally executed program within the individual DE breaker. Further, no provision is made in such DE breakers to analyze power line circuit conditions that are common to all DE breakers in the power distribution system in order to obtain an evaluation of the conditions of the system. There is additionally no affordable means available, even with the advanced circuit breakers mentioned hereinabove, for presently monitoring, controlling or reconfiguring circuit breaker elements within an electrical power distribution system in residential environments.

SUMMARY OF THE INVENTION

The present invention disclosed and claimed herein comprises a circuit breaker system that includes a plurality of individual breakers and a central controller. The individual breakers each have a controller for controlling the operation of the associated breaker and a monitor for monitoring the operation of the breaker. A historical memory is also provided for storing monitored information generated over time by the monitor. A breaker communication port is provided for communicating with the historical memory. A communication interface provides communication interface between each of the breakers, and its associated communication port, and a controller communication port on the central controller. The central controller has a central memory for storing historical memory information associated with select ones of the individual breakers and also includes a communication device. The communication device is operable to communicate through the controller communication port with a select one of the breakers and for accessing the contents of the associated historical memory and downloading data therefrom in storage in the central memory.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
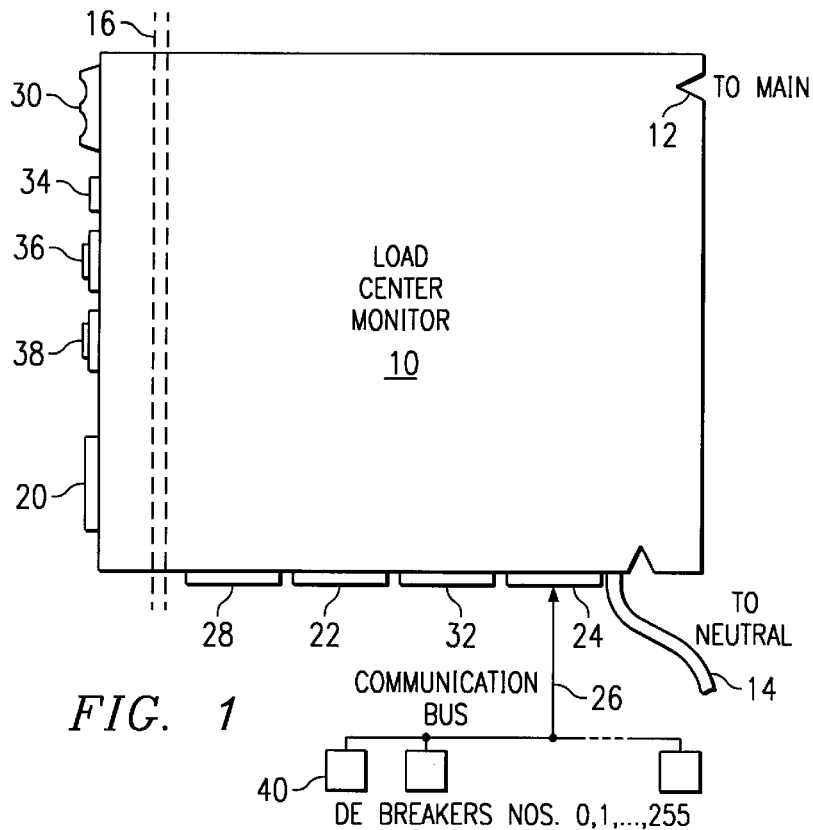
FIG. 1 shows a block diagram of a Load Center Monitor and its connections to external features in an electrical power distribution system.

Referring now to FIG. 1, a load center monitor 10 is shown typically enclosed in a circuit breaker housing of standard configuration including connection to the main and neutral wires of a power distribution system. Also shown by way of example, in dashed lines, is a panel 16 for supporting and/or enclosing the load center monitor (LCM) 10. The connection of the main power line is shown at terminal 12 and the exemplary pigtail connection of the neutral power line is shown at line 14. The LCM 10 has several input/output ports or output terminals as follows: a user port 20 is provided for connecting the LCM 10 to and from a first remote terminal. A service port 22 is provided for connecting the LCM 10 with a second remote terminal. A communication port 24 interconnects the LCM 10 with a communication bus 26.

Connected to the communication bus 26 of the LCM 10 is a plurality of DE breakers, each one being indicated by the reference numeral 40 and each DE breaker 40 being connected in parallel to the communication bus 26. Each DE breaker 40 is identified by a unique address assigned by the LCM 10 to be described in detail hereinafter. Each of the DE breakers 40 is an electronic circuit breaker of the type described in the U.S. Pat. No. 5,875,087 entitled "CIRCUIT BREAKERS WITH INTEGRATED CONTROL FEATURES." The DE breakers 40 function according to one or more programmed trip profiles stored in the DE breaker memory. The trip profile is primarily for tailoring the response parameters of the individual DE breaker to the load current that flows in the circuit protected by that particular DE breaker. The response parameters are in the form of data constants, which represent current and time values, weighting factors and the like and are stored in one or more tables of the memory in each DE breaker. These data constants can be dynamically changed on a continuous basis by the DE breaker itself or by the LCM 10. Typically, this dynamic change or updating of the breaker tripping response parameters is performed on command from the LCM 10 or even an external computer; however, the DE breaker itself can change the trip profile data constants under certain conditions.

In addition to the normal load current response mode of the individual DE breaker, and the arcing response mode that will be described with respect to FIG. 7B hereinbelow, the DE breaker has a third operational mode. This operational mode is the ground fault circuit interrupting mode in which the DE breaker is responsive to a leakage current condition between the hot and the neutral line of a particular branch circuit to which a number of devices may be connected. The operation of this response mode was also thoroughly described in the previously mentioned U.S. Pat. No. 5,875,087, entitled "CIRCUIT BREAKER WITH INTEGRATED CONTROL FEATURES".

Also shown connected to the LCM 10 is a diagnostic output 28 for connection to a test terminal, primarily for use during manufacturing. Ports 20, 22, 24 and 28 may conveniently be modular telephone receptacles, for example. The LCM 10 further includes alarm output 32 which may also be a modular telephone receptacle, and a visible indicator 34, which may include one or more light emitting diodes or other display. The visible indicator 34 may be mounted on the same surface of the LCM 10 as the user port. Notice that both of these features are shown on the left hand border of FIG. 1 to be visible to one who is facing a panel that includes the LCM 10 and an array of circuit breakers installed in a standard service box of an electrical distribution system. The other ports and outputs are arranged on the LCM 10 so as to be accessible when the panel supporting the LCM 10 and the other circuit breakers in the system are accessible from the backside of the panel 16.

The user port 20 and the service port 22 provide for connection to the LCM's 10 signal processor with an external data-monitoring and/or data control system. This arrangement of communication ports 20 and 22 allows continuous readout of the LCM's 10 internal data. Moreover, the external controller can communicate with the DE breakers in the system using the LCM 10 to relay the data in both directions. In a preferred embodiment, the user port 20 and the service port 22 may be serial I/O ports and implemented according to the EIA RS-232C Asynchronous Interface Protocol. Other data communication standards and protocols may, of course, be used depending on the circumstances of a particular application. Although user port 20 and service port 22 in the preferred embodiment are essentially identical, they can be defined differently depending on the application. Included among the applications user port 20 or service port 22 can be used for are, for example, obtaining data from the memory within the LCM 10 or giving commands to the LCM 10 for control and reconfiguration purposes.

Continuing with FIG. 1, communication bus 24 can be either an I/O serial port such as the user port 20 or service port 22 or a low speed communication port, such as defined by the industry standard $I^2C$ protocol for interconnecting integrated circuits with each other. In this case, the integrated circuit or the microprocessor in the LCM 10 may be connected over the communication bus 24 to any of the DE breakers 40 connected to communication bus 26. Communication bus 26 is preferably a bidirectional bus that enables data communication between any DE breaker 40 and the LCM 10. In the preferred embodiment, communication bus 26 is a three-wire bus including two data lines, local bus 1 and local bus 2, and a third return line.

In operation, a specific communication protocol has been devised for the use of this bus according to programs stored within the LCM 10. The operation of this protocol will be described hereinafter. The DE breakers connected to communication bus 26 are described in U.S. Pat. No. 5,875,087 entitled "CIRCUIT BREAKERS WITH INTEGRATED CONTROL FEATURES", which application is incorporated herein by reference in its entirety. Moreover, conflicts between the individual DE breaker 40 units connected to communication bus 26 are resolved by a unique addressing scheme described hereinbelow in conjunction with FIG. 4 and TABLES A and B in which addresses are assigned automatically when a new DE breaker is installed and connected to communication bus 26.

The diagnostic output 28 is the output of an internal pulse width modulator within the LCM 10. This pulse width modulated (PWM) output may be connected to a digital circuit analyzer or a test terminal for obtaining data from status registers or data related to certain operating parameters within the LCM 10. For example, the average value of the PWM output may be used for diagnostic purposes to monitor data values inside the CPU of the LCM 10 with, for example, an oscilloscope or digital analyzer.

The visible indicators 34, implemented for example in the preferred embodiment by multiple color (e.g., red, green)

light-emitting diodes, are used to indicate the status of the system including the DE breakers 40 and the LCM 10. These colors are incorporated in one assembly in the preferred embodiment for convenience, but in principle, they may be in separate packages or may be different colors. Further, the status indication displayed by the visible indicators 34 may be programmed to indicate other functional status information. Typically, the green LED flashes every two seconds in the preferred embodiment when the LCM 10 and all the associated DE breakers 40 are operating normally. When one of the DE breakers 40 trips, the red LED flashes in various code patterns to indicate the nature of the problem detected by the LCM 10. It should not be construed that the visible indicator 34 is limited to the use of LEDs. On the contrary any display configuration suited to the application may be used in the present invention.

The external alarm connector 32 provides a connection for an external alarm. This terminal includes a power driver output to drive an external alarm such as an audible beeper or buzzer. The external alarm may be a dedicated unit or a feed to a general purpose emergency or security alarm system. This could be an RF wireless connection to a fire department, for example. This driver can be isolated or non-isolated from the AC line for safety purposes. The external alarm can likewise be driven in a coded pattern to provide specific information regarding the event causing the alarm. Pre-recorded voice messages for specific conditions, stored within the LCM 10 or a remote terminal, may also be activated during operation of the external alarm function. LCM 10 further includes a power reset button 36 for operating a resettable fuse connected between the main terminal 12 and the power supply of the LCM 10. A clear button 38 is also provided on the LCM 10 for clearing an audible alarm indication activated by the LCM 10, for selecting operating modes of the LCM 10, and for initiating a self-test routine during servicing.

Figure 2A:
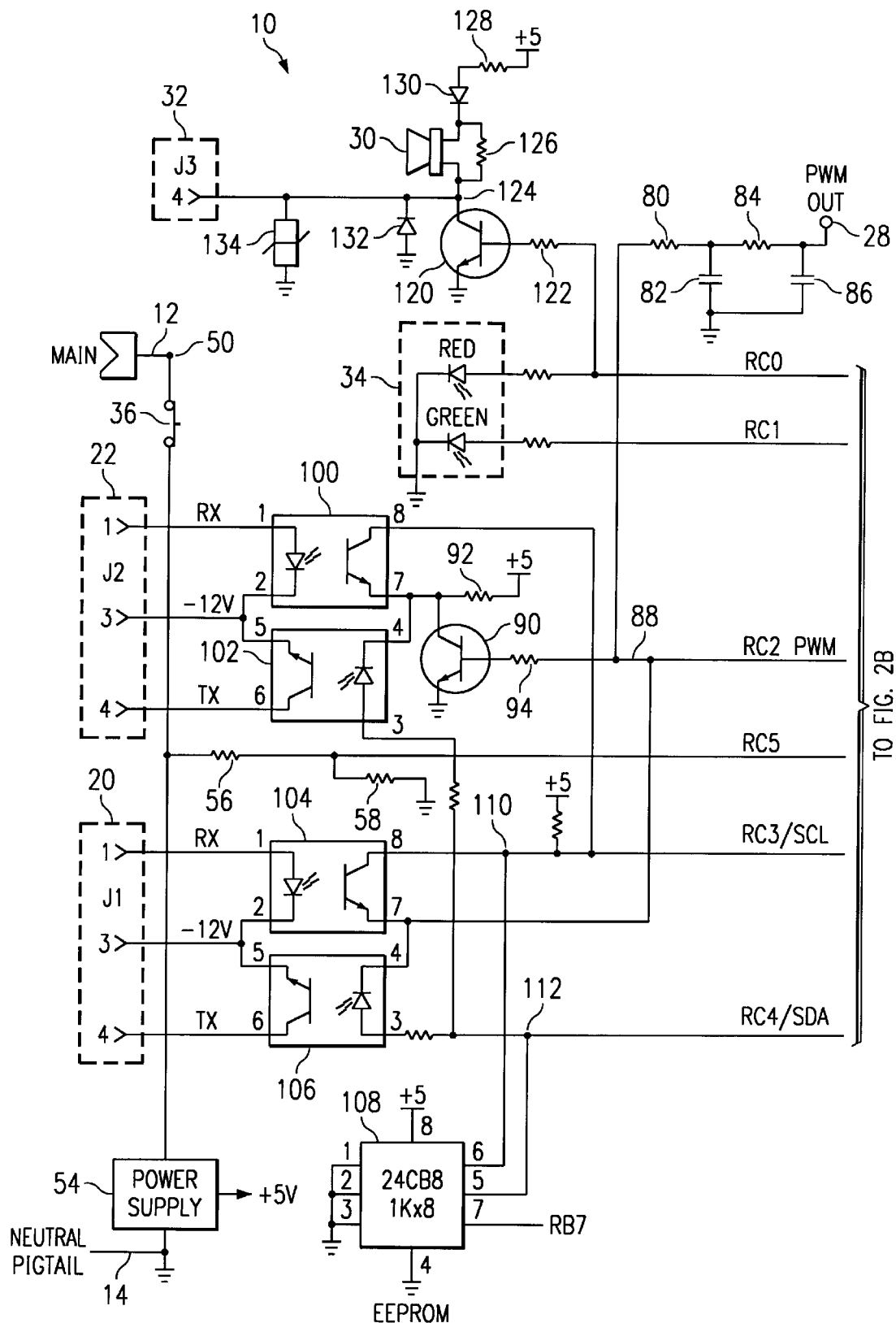
FIGS. 2A and 2B show an electrical schematic of a Load Center Monitor.
Figure 2B:
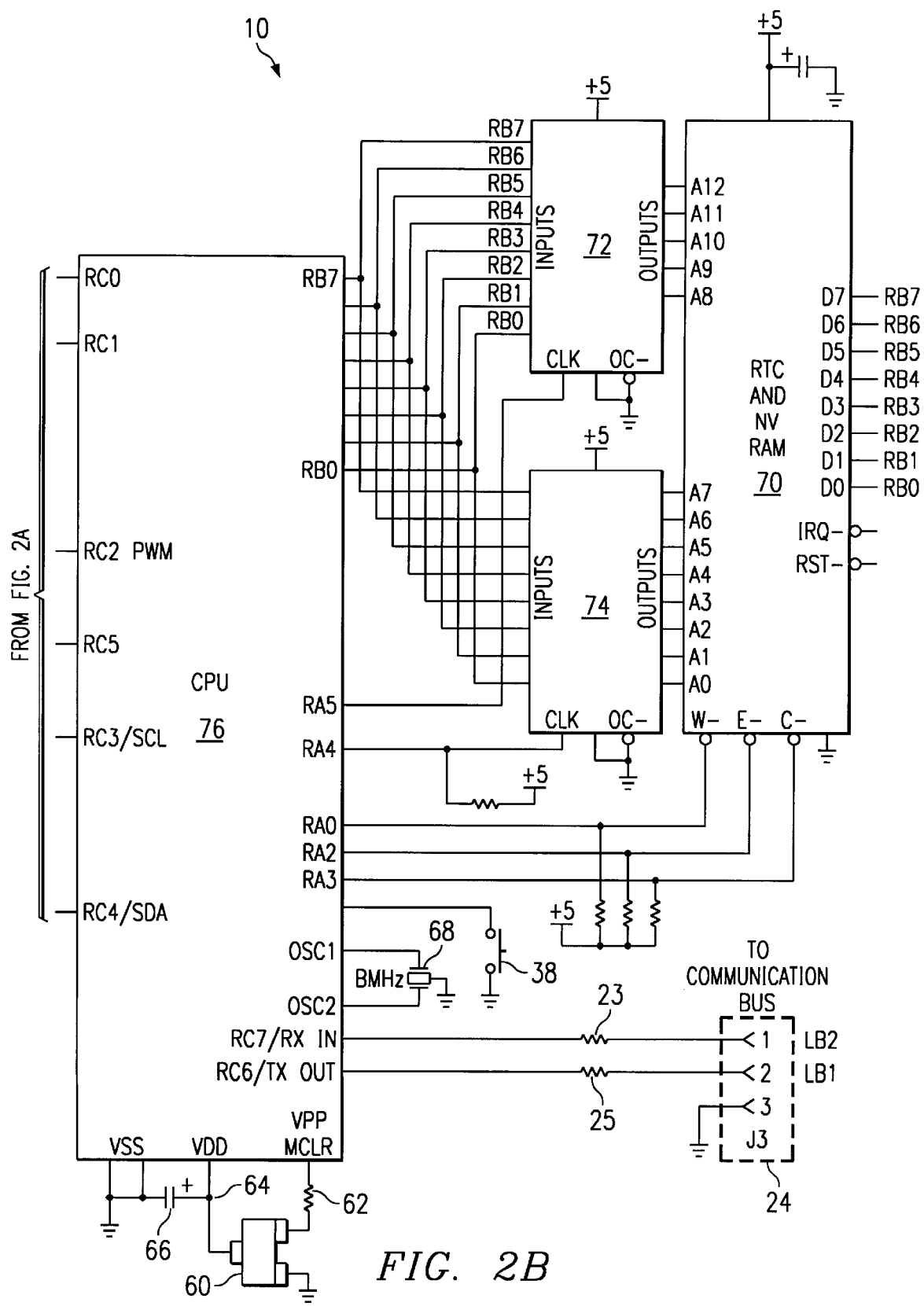

Referring now to FIGS. 2A and 2B, the LCM 10 is shown in a block diagram schematic including central processing unit or CPU 76 along with its associated non-volatile memory 70, a power supply 54, and the various communication ports described hereinabove. Also shown is circuitry for the diagnostic output 28, the external alarm 32 and the visible indicators 34. Power for the LCM 10 is provided by main power line 12, shown connected to node 50 via resettable fuse 36. A resistor 56 is connected between node 50 and pin RC5 of CPU 76. Pin RC5 is further connected to ground through resistor 58. All operations inside CPU 76 are synchronized with the AC line frequency (50 Hz or greater) through the coupling from node 50. Resistors 56 and 58 provide this synchronizing signal at a logic level input to the CPU 76. Pin RC5 is further connected inside CPU 76 to a zero-crossing detector. Further connected to node 50 is the input line to the power supply 54. The output of power supply 54 supplies a +5 volt DC voltage to operate the circuits in the LCM 10. The connection between the neutral power line 14, which in the illustrative embodiment may be a pigtail lead, and the ground circuit of the LCM 10 is also shown in FIG. 2A.

The LCM 10 the associated real time clock (RTC) and non-volatile memory ("NVRAM") 70 is connected to the CPU 76 through a pair of data buffers 72 and 74, each via an 8-bit bus, which are used to store the complete 12-bit address for the 8K byte RTC/NVRAM chip 70. The memory portion of RTC/NVRAM 70 is provided primarily for storing data from the DE breakers and other data which is not critical to the operation of the LCM 10. Although shown for the preferred embodiment, the use of data buffer 72 and data buffer 74 in discrete forms is not essential. In other implementations, data buffers 72 and 74 may be integrated within the RTC/NVRAM chip 70 itself The CPU 76 in the preferred embodiment is an 8-bit microcontroller such as a PIC 16C73A manufactured by Microchip Technology, Inc. The CPU 76 communicates with the RTC/NVRAM 70 through the array of data lines shown in FIG. 2 as RB0 through RB7. These lines are connected respectively to data buffer 72 and data buffer 74 and therethrough to the RTC/NV RAM 70. In operation, the RTC portion of RTC/NVRAM 70 is provided to time-stamp the data downloaded from the DE breakers 40 and stored in the NVRAM for historical and analysis purposes. Time-stamped data is particularly useful when reconfiguring trip profiles for extended power outages, to accommodate the extremely high peak inrush currents flowing in a large number of incandescent lamps whose filaments have cooled substantially since the power outage occurred. Various control lines connecting the CPU 76 to the RTC/NVRAM 70 include connections to I/O terminals RA0, RA2 through RA3, RA4, and RA5 of CPU 76. Several of these lines, for example RA4, the clock line to data buffer 74, include pull-ups to the +5 volt power supply. Similarly, the control lines connected to I/O ports RA2, RA3 and RA0 are connected through respective pull-up resistors to the +5 volt power supply.

The operating frequency of the microprocessor or central processing unit 76 shown in FIG. 2B may be controlled by a crystal or ceramic resonator or some other means of frequency control such as a capacitor combined with a resistor or even an inductor. In the preferred embodiment, crystal 68 operates at a frequency of 8.0 MHz. The terminals of crystal 68 are connected to the terminals labeled OSC1 and OSC2 on CPU 76. A brown-out detector 60 is connected between the VDD terminal and the VPP or Master Clear terminal (a reset pin) of CPU 76. In operation, brown-out detector 60 generates a reset signal during any period that the voltage input to power supply 54 falls below a predetermined level. The reset connection between brown out detector 60 and the VPP terminal of CPU 76 is coupled through resistor 62. A third terminal of the brown-out detector 60 is connected to system ground.

The brown-out detector 60 used in this illustrative embodiment may be a MAX889 manufactured by MAXIM Integrated Products, Inc. The VSS terminal of CPU 76 is connected to system ground. A capacitor 66 is connected between the VDD terminal and the VSS terminal of CPU 76. The VDD terminal of CPU 76 is also connected to the output of power supply 54. The DC power for this microprocessor CPU 76, is developed from the AC powerline at line 12 via resettable fuse 36 and power supply 54. The power supply 54 operates as described in U.S. Pat. No. 5,875,087 entitled "CIRCUIT BREAKER WITH INTEGRATED CONTROL FEATURES" and will not be described further herein.

The input/output communication ports of the LCM 10 will now be described. User port 20, shown in FIG. 2A at connector J1, has three wires connected to the CPU 76 through a dual opto-coupler for isolating the communication port from the circuitry within the CPU 76. The incoming receive line labeled RX is connected to pin 1 of opto-isolator 104 and exits from output pin 2 of opto-isolator 104 to connect to a common terminal which is connected in turn to the −12 volt line at pin 3 of J1, the user port 20. Terminals 1 and 2 of the opto-isolator 104 are connected to the anode and cathode respectively of the internal light-emitting diode, i.e., the input side of opto-isolator 104. The output side, which is an optically operated transistor is connected to terminals 8 and 7 of opto-isolator 104 with the collector of the output transistor connected to terminal 8 and the emitter connected to terminal 7 of the opto-isolator 104. The collector of the output transistor at terminal 8 connects to the RC3/SCL pin of CPU 76. This is the receive input line for the user port 20. The return side of the output of the transistor at pin 7 of opto-isolator 104 is connected to the RC2/PWM terminal of CPU 76. A pull-up resistor is connected from pin 8 of opto-isolator 104 to the +5 volt supply. The output or transmit line TX of user port 20 begins at pin RC4/SDA of CPU 76 and is connected through a series resistor to pin 3 of opto-isolator 106 to the anode of the light-emitting diode within the opto-isolator 106. The cathode of the light-emitting diode in opto-isolator 106 connects to a common line connected to pins 4 and 7 of opto-isolators 104 and 106 and the RC2 input pin of CPU 76. The output of opto-isolator 106 is an optically operated transistor with the collector at pin 6 and the emitter at pin 5. Pin 5 is connected to the −12 volt common line to the user port 20 and pin 6, the output of the transmit line, is connected to terminal 4 of J1 of user port 20. The −12 volt line of the IO port is connected to terminal 3 of J1 of user port 20.

Service port 22 is similar to user port 20 in that it includes a connector J2 having terminals 1, 3 and 4. The receive line RX at terminal 1 of J2 of the service port 22 is connected to pin 1 of opto-isolator 100 which is the anode of the light-emitting diode within opto-isolator 100. The return path, that is the −12 volt line, is connected to terminal 2 of opto-isolator 100 and to terminal 3 of J2 of the service port 22. The receive output of opto-coupler 100 is at terminals 8 and 7 with terminal 8 connected to the internal transistor of opto-isolator 100 and terminal 7 of opto-isolator 100 connected to the RC3/SCL pin of CPU 76. The return side of the receive line from the output of opto-isolator 100 at pin 7, which is connected internally to the emitter of the internal transistor, is connected to the collector of transistor 90 and from there through resistor 92 to the +5 volt supply. The emitter of transistor 90 is connected to ground. The base of transistor 90 is connected through series resistor 94 to node 88 and, in turn, to the output pin RC2/PWM of CPU 76. Transistor 90 selects which of the two I/O ports, user port 20 or service port 22, will be active.

Continuing with the service port 22 shown in FIG. 2A, the outgoing transmit line TX outputs from the collector of the internal transistor of opto-isolator 102. The emitter of the internal output transistor is connected to the −12 volt line which connects to pin 3 of connector J2. The outgoing transmit line TX at pin 6 of opto-isolator 102 is connected to terminal 4 of connector J2. The outgoing transmit line for the service port 22 begins at pin RC4/SDA of CPU 76 and continues through a series resistor to pin 3 of opto-isolator 102, which is the anode of the internal light-emitting diode of opto-isolator 102. The return side of the input connection to opto-isolator 102 at pin 4, the cathode of the light-emitting diode within opto-isolator 102 is connected to the collector of transistor 90. It will be appreciated from the above description that both of the output terminals of the incoming receive lines of user port 20 and service port 22 are connected together to a pull up resistor to the +5 volt supply and to the RC3/SCL pin of CPU 76. Also connected to this pin is pin 6 of a 1K×8 EEPROM 108 which is provided for storing information critical to the operation of the LCM 10. Such information includes data that must be retained in the event of a complete power failure. Pin 5 of EEPROM 108 is connected to pin RB7 on CPU 76. Pins 1, 2, 3 and 4 of EEPROM 108 are connected to ground and pin 8 of EEPROM 108 is connected to the +5 volt supply. Various configuration parameters for the LCM 10 system may be saved in EEPROM 108 for shifting into the CPU's memory when called upon by a step in one of the operating program routines. EEPROM 108 may further hold the primary addresses of each DE breaker 40 as they are assigned by the LCM 10 as well as parameter settings and trip profiles of the individual DE breakers 40 connected to the communication bus 26. As shown, EEPROM 108 may also be accessed through either user port 20 or service port 22. It will also be appreciated by persons skilled in the art that other data storage configurations may be used to satisfy the functions supplied by EEPROM 108.

Continuing with FIGS. 2A and 2B for the LCM 10, there is connected to pin RC0 of CPU 76 the anode of a red light-emitting diode through a resistor. Similarly, there is connected to pin RC1 of CPU 76 the anode of a green light-emitting diode through a resistor. While the colors red and green are shown in the illustrative embodiment, other or additional colors may be employed and the choice of red and green is not intended to be limiting. The cathodes of both the red and the green light emitting diodes used as the visible indicator 34 are connected to ground. The signal at pin RC0 of CPU 76 is also connected through resistor 122 to the base of transistor 120. The emitter of transistor 120 is connected to ground. Transistor 120 is a driver transistor for operating an internal audible alarm such as buzzer 30 and/or for driving an external alerting signal through terminal 4 of connector J3, thus providing the audible alarm 32 shown in FIG. 2. The collector terminal of transistor 120 includes buzzer 30 which is connected through diode 130 and resistor 128 in series to the +5 volt supply. Resistor 126 is connected across buzzer 30. Buzzer 30 may be an audible annunciator having the appropriate sensitivity and output characteristic. In operation, when the line from pin RC0 of CPU 76 is active, the red light-emitting diode of visible indicator 34 will flash, the driver transistor 120 will turn on to operate the buzzer 30 and provide a signal at terminal 4 of connector J3 to operate the external audible alarm 32. An intelligent alarm may be provided by utilizing driver transistor 120 in a pulsed mode for sending an encoded message. Also connected from the output terminal of collector terminal of transistor 120 is a reverse-biased rectifier 132 connected to ground and a transient absorbing device 134 connected to ground.

Associated with the audible alarm provided by the illustrative buzzer 30 are functions for clearing the audible alarm and for setting various operating and test modes of the LCM and the DE breaker 40 using a CLEAR button 38 connected to CPU 76 provided therefor. Pressing the CLEAR button 38 may be used to clear the alarm until a service person responds to the alarm. In operation, the alarm may be set in a mode to reactivate the alarm after specified intervals wherein the intervals may be adjusted for example, as to duration, volume, pitch or repetition rate, corresponding to various levels of urgency associated with or conditions which triggered the alarm. Further, the CLEAR button 38 may be pressed to initiate a self-test routine during servicing.

Continuing further with FIGS. 2A and 2B, for LCM 10, the PWM output of CPU 76 is provided at pin RC2. This pin RC2 is also connected to node 88 which is coupled through resistor 80 and resistor 84 to the PWM output 28. Connected from the junction of resistor 80 and resistor 84 is a capacitor 82 connected to ground; similarly, from the junction of the PWM output 28 and resistor 84 is a capacitor 86 also connected to ground. The combinations of resistor 80 and capacitor 82 and resistor 84 and capacitor 86 form a low pass filter of the PWM output to the diagnostic output 28.

In operation, CPU 76 shown in FIG. 2B is programmed according to flow charts to be described hereinafter, to store time-stamped data supplied by individual DE breakers 40 in the non-volatile memory portion of RTC/NVRAM 70. Thus data logging information is retained in the non-volatile memory 70 even when there is no AC power for the LCM 10. Further, the EEPROM 108 is available for storing the various configuration parameters for both the LCM 10 and the connected DE breakers 40 as well as the primary addresses of the individual DE breakers connected to communication bus 26. The use in the preferred embodiment of EEPROM 108 for storage of configuration parameters and primary addresses is not intended to be limited; this data may also be stored in non-volatile memory, for example. Thus it is one of the principal functions of CPU 76 to obtain and store the data logging information from the DE breakers in the system for later use in analysis or remote control operations to be described hereinbelow. Another principal function of CPU 76 is to perform parameter analysis of the time-stamped data stored in the non-volatile memory 70 to modify by adaptively reconfiguring the trip profiles of individual DE breakers as necessary according to conditions experienced by that individual DE breaker, and to report the evaluation of such data for use by personnel maintaining the system. Yet another function of the CPU 76 in LCM 10 is to control or participate in the remote control of and/or reconfiguration of the data logging, analysis or adaptive reconfiguration of the LCM/DE breaker network comprising of the LCM 10 and associated plurality of DE breakers 40 in an electrical power distribution system. Among the status indicators provided by the LCM 10 are the previously mentioned audible alarm provided by buzzer 30, the visible indicator 34 provided, for example by the red and green light-emitting diodes, and the signal provided by driver transistor 120 to the external alert terminal 32. The alarm indications provided by these three outputs provides information on the status of the LCM 10 and any of the associated DE breakers 40.

Continuing with the operation of the LCM 10, another principal function of the LCM 10 is the remote data logging of DE breaker 40 status and AC power line or load circuit status and line transients as well other conditions on the AC power line network into which the LCM 10 is connected. For example, all data inside the CPU 76 is accessible by a remote control system for monitoring of LCM 10 data and the status of individual DE breakers 40. During the data collection activity, there is no compromise of the DE breaker's normal ability to detect circuit overloads and arcing. If several DE breakers 40, for example, are indicating a particular condition at the same time, the LCM 10 can use this commonality to detect problems that originate closer to the power source, such as a loose connection between the breaker box and the distribution transformer. Thus, by remote control, data logging information and status information may be obtained through either the user port 20 or the service port 22. Further, the remote units communicating through either of these ports may issue commands to the LCM 10 to respond appropriately to conditions that are reported to the remote controller over the user port 20 or the service port 22. Such monitoring activity may be the result of normal service routines performed on the system or, in the case of an emergency, queries can be made over the communication ports to obtain information related to an existing or a potential emergency situation. Similarly, the data acquisition properties of a LCM 10 can be used to analyze and monitor information supplied by the DE breakers 40 and issue various alarms or alert notices to the remotely located terminals. Moreover, upon a command from one of the remote terminals over one of the communication ports such as the user port 20 or the service port 22, a command for providing adaptive control of an individual DE breaker 40 in the network of circuit breakers connected to the communication port 24 can be used to adjust the response or trip profile of the individual DE breakers 40 to conditions existing on the power line on the branch circuit protected by that individual DE breaker 40.

Continuing with the operation of LCM 10 shown in FIGS. 2A and 2B, it has been described previously how transistor 90 operates as an enabling switch for user port 20 and service port 22. This transistor may be operated by a control bit output from CPU 76 at pin RC2. This single bit may be generated to control communication on either port by selecting the port to be used. Moreover, this same bit may be programmed as the output of the pulse width modulator (PWM). In such case, the output of the pulse width modulator at pin RC2 of CPU 76 may be coupled to the pulse width modulator output 28 for conveying diagnostic data to a manufacturing terminal to monitor data values inside the CPU 76.

Yet another important principal feature of the LCM 10 shown in FIGS. 2A and 2B is the re-configureability that is available because of the programmability of CPU 76. As previously described, a microcontroller such as the PIC 16C73A manufactured by Microchip Technology, Inc., is used for maximum versatility. This device can be programed after assembly and even modified by remote control for special requirements. Thus, different characteristics may be programmed into the CPU 76 of the LCM 10, both when the unit is manufactured and also in the field by remote control action through either one of the remote I/O communication ports, user port 20 or service port 22. This re-configureability may be important when adapting the trip profile of individual circuit breakers on a particular branch circuit to particular kinds of appliances or other loads. Trip profiles having differing characteristics for turn-on surge current and overload characteristics, such as electric motor stalling and inductive switching are just two of the illustrative examples of the many characteristics that can be adopted. These differing characteristics of the kinds of loads that are attached to individual branch circuits in an electrical power distribution system are described in detail in U.S. Pat. No. 5,875,087, incorporated in its entirety by reference herein.

Yet another feature available because of the presence of the programmable microcontroller as used for CPU 76 is the ability to perform automatic self-tests at regular time intervals, update those results and store those results in the non-volatile memory 70 at periodic intervals. For example, in the preferred embodiment, the automatic self-test routine may be performed every nine minutes, or at other selected intervals, upon a command from a remote controller system through user port 20 or service port 22. As will be described hereinbelow, the automatic self-test routine can provide information about a number of hardware or software operating parameters that exist in a LCM/DE breaker system.

Figure 3:
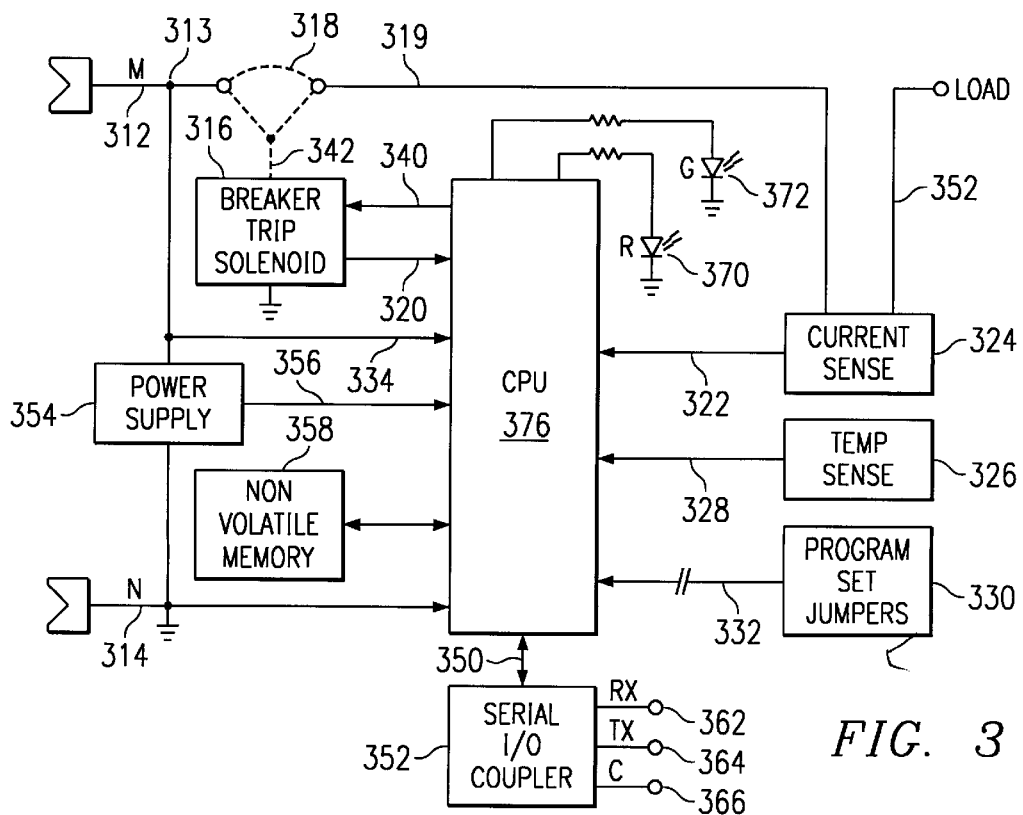
FIG. 3 shows a block diagram of an Digitally Enhanced Circuit Breaker.

Referring now to FIG. 3, there is shown a block diagram of a DE breaker of the type used in conjunction with the LCM 10 of the present invention. Each DE breaker 40 of the type shown in the preferred embodiment of FIG. 3 includes a CPU 376 connected to a plurality of sense inputs, a serial I/O communication port, a power supply and a non-volatile memory 35 sufficient to store basic configuration parameters and addresses which are entered during manufacturing. The incoming main power line 312 is connected to a node 313 and further to the input of a circuit breaker 318. The output of circuit breaker 318 is further connected to a node 319 and therefrom to the input of the current sense circuit 324 of the DE breaker. The output terminal of the current sense circuit 324 is connected to the load terminal 352. The neutral power line at line 314 is connected to the ground terminal of the DE breaker and also to the ground terminal of the power supply 354 and CPU 376 within the DE breaker. AC voltage is supplied to power supply 354 from node 313. The output of power supply 354 is supplied on line 356 to the VDD terminal of CPU 376 shown in FIG. 3. Node 313 at the input to circuit breaker 318 is connected through line 334 to the first voltage sense input of CPU 376. A second voltage sense input to CPU 376 is provided from the neutral side of breaker trip solenoid 316 via line 320. The purpose of providing two voltage sense inputs will be described in detail hereinafter. It will be appreciated, however, that the first voltage sense input is responsive to voltage changes that occur upstream from the DE breaker 40, that is, changes such as voltage dropouts which will affect all DE breakers in the system. The second voltage sense input is also responsive to upstream voltage changes as long as the breaker has not tripped. Since both voltage inputs are responsive to the voltage on the AC power line and are connected to opposite sides of the breaker trip solenoid 316, sensing both lines 320 and 334 allows for testing the solenoid coil in breaker trip solenoid 316. Moreover, the first voltage sense line 334 may also be used to sense conditions on the upstream side of the DE breaker even after it has tripped. Circuit breaker 318, which is of the type of circuit breaker described in detail in U.S. Pat. No. 5,875,087 includes a trip override feature which is supplied by breaker trip solenoid circuit 316 shown in FIG. 3 of the present application. The output of breaker trip solenoid circuit 316 is applied through control path 342 to operate the solenoid contacts to cause circuit breaker 318 to trip immediately upon an appropriate trip signal supplied by CPU 376. A trip signal is provided over line 340 from CPU 376 to the input of the breaker trip solenoid circuit 316.

Continuing with FIG. 3, showing the block diagram of a DE breaker 40, an output for each of the visible indicators, a red light-emitting diode 370 and a green light emitting diode 372 is provided. Each of these light emitting diode (LED) visible indicators 370 and 372 are provided outputs by CPU 376 to provide visual indicators of conditions within the CPU 376 of a DE breaker 40. CPU 376 further has an input line 322 which connects the output of the current sense circuit 324 to CPU 376, to provide an input for sensing the load current by the CPU 376. There is further provided the output of temperature sense unit 326 through line 328 to another input of CPU 376 for monitoring the temperature of the DE breaker 40. There is yet another set of lines denoted as program lines 332 between program jumper set 330 and CPU 376. The program jumper set 330 provides for programming various functions of the CPU 376 in response to particular circumstances of the installation in which the DE breaker 40 shown in FIG. 3 is used. There is also shown in FIG. 3 the serial I/O coupler connected to CPU 376 through line 350. Line 350 enables bidirectional data communication between CPU 376 and a compatible terminal connected to the communication bus represented by the receive, the transmit and the common lines attached to the serial I/O coupler 352. In the typical installation, the three-wire bus connected to the output of serial I/O coupler 352 provides a bidirectional communication path between the DE breaker 40 and the CPU 376 in the LCM 10 of the present invention.

Continuing with FIG. 3, other features of the DE breaker 40 include first, storage capacity within CPU 376 for storing predetermined performance parameters. The controller within CPU 376 compares outputs of current sense unit 324, the temperature sense unit 326, and the voltage sense units through lines 320 and 334 to generate control signals when these parameters exceed the predetermined operating thresholds. Second, the input/output port provided by the serial I/O coupler 352 enables communication with a computer external to the DE breaker 40. This allows information to be transmitted to and from the external computer. The controller within CPU 376 is therefore operable to receive data from the serial input/output port 352 regarding new desired operating relationships or trip profiles for storage in the memory within CPU 376. For example, data can be uploaded from the DE breaker to the external or remote computer or new trip profiles for the operation of the circuit breaker can be downloaded from the external or remote computer. Moreover, remote control of the DE breaker can be used to override the trip mechanism in the DE breaker and trip the circuit breaker in certain conditions. For example, in the event of fire conditions detected within the building that houses the LCM 10 and its associated DE breakers 40, a command can be issued to the LCM 10 and, in turn, to the DE breaker 40 to trip a particular branch circuit in the vicinity of the detected fire hazard. Further, remote control can be used to disable the trip override feature in a DE breaker so that it will operate as a conventional, thermally operated circuit breaker, for example during maintenance.

Continuing further with FIG. 3, a zero-crossing detector within CPU 376 makes use of inputs provided by both the current sense circuit 324 and the second voltage sense input. Voltage dividers (not shown in FIG. 3) reduce the input voltage to a level within the ratings of the zero crossing detector circuits within CPU 376. The zero-crossing detector can determine, from the waveforms present at these two inputs to CPU 376, the phase angle of the current to the load relative to the voltage supply to the load, thus determining the type of load that is connected to load terminal 352. Thus, characteristics peculiar to the particular load can be known and the trip profile for an individual DE breaker adapted to the particular load. Furthermore, within an individual DE breaker, a memory contains a family of trip point profile curves. Thus, the trip point profile curve needed for a particular kind of load can be retrieved from the family of trip point profile curves stored in memory. These trip profiles are selectable either by the user or as a function of the measured parameters determined by the DE breaker 40 from inputs provided by the current sense input 324, temperature sense input 326 or the first and second voltage sense inputs through lines 334 and 320.

Continuing with the operation of the DE breaker shown in FIG. 3, the DE breaker 40 is programmed, in effect, to take a snapshot of multiple data values at the end of each half cycle of the incoming AC power line signal. This data will be saved in the memory buffer of the DE breaker 40 within CPU 376 until the breaker 40 has a chance to offload the data to the LCM 10. In normal operation, the LCM 10 can collect the data for an individual DE breaker 40 during one full AC cycle.

In operation, the CPU 376 shown in FIG. 3 receives voltage sense inputs from a first input connected to the incoming AC supply voltage and also from a second input connected to the neutral side of the breaker trip solenoid 316. The first voltage sense input thus detects voltage drop outs which may be caused by arcing across an open circuit or a loose connection in the upstream circuit or across the hot and neutral wires in the upstream circuit. Such a condition would affect all the DE breakers 40 served by the malfunctioning power line. The response of the LCM 10 to upstream arcing and voltage drop outs is described in conjunction with FIG. 7B.

In another fault condition, suppose the LCM 10 receives data from all DE breakers 40, having the same time stamp values, that arcing or drop outs are indicated downstream because the De breaker 40 current sense inputs detect a current drop-out. The LCM 10 interprets this condition as a loose or open connection in the neutral wire and accordingly activates an alarm as described in conjunction with FIG. 7B.

It will be appreciated by persons skilled in the art that the concept of the LCM 10 and DE breaker 40 network or system illustrated herein may also be applied to DC circuits as well as to AC circuits. In AC circuits the power line frequency provides a convenient reference for synchronizing the operations performed by the LCM 10 and the DE breakers 40. However, in a DC circuit system, the choice of synchronizing reference is up to the designer to select one appropriate for the application. Reference timing may, of course, be supplied by a system oscillator or some other stable source provided for this purpose.

This completes the detailed description of the principle structural features of the LCM 10 and the DE breakers 40 intended to be used therewith. The remaining detailed description will address two major areas. First, the communication between the LCM 10 and the DE breakers 40 will be described in conjunction with FIG. 4. This description will include the automatic address assignment routine for the individual circuit breakers, the communication protocol and arbitration used to operate the intercommunication between these two units, and the processing of parametric data saved by the LCM 10. Second, the program operating routines for the LCM 10 will be described with the aid of FIGS. 5, 6, 7 and 8. Additional mechanical features of the LCM 10 and DE breakers 40 system will be described in conjunction with FIGS. 9, 10 and 11.

Figure 4:
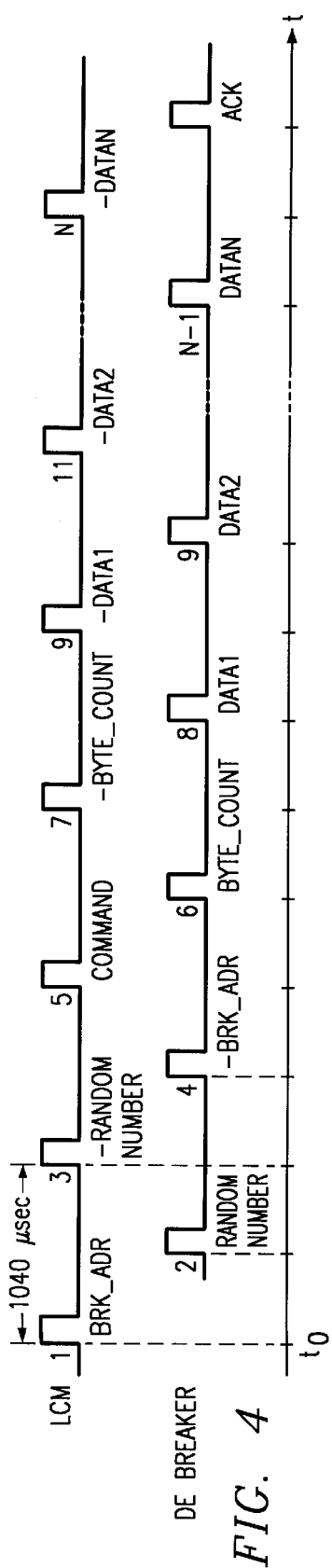
FIG. 4 shows a timing example for the communication protocol between a Load Center Monitor and an Digitally Enhanced Circuit Breaker.

Preparatory to the description of FIG. 4, it will be helpful to describe the basis for the timing used by both the communication protocol and the A/D converters in the DE breakers 40. In both cases, these timing frequencies are keyed to the AC line frequency. For example, the sampling rate of the A/D converters is $1/16$ of the period of $1/2$ cycle of the 60 Hz power line frequency. This calculation works out to $1/16 \times 8.33$ milliseconds or approximately 520 microseconds for the duration of a sampling interval. The 520 microsecond interval is also the length of a communication data byte which is transmitted between the LCM 10 and a DE breaker 40. As is well known, an individual data byte consists of a start bit, 8 data bits, a parity bit and a stop bit for a total of 11 bits. In operation, 16 data samples are acquired for an individual DE breaker 40 during a half cycle of the 60 cycle AC line frequency. This sampling rate is synchronized by the zero-crossing detector in the microcontroller, CPU 76. The first sample begins at the zero-crossing, the eighth sample occurs at the AC line waveform peak, and the sixteenth sample occurs just prior to the next zero-crossing. These and other sample positions will become important during the description of the program flow charts to be described hereinbelow.

Responsive to the AC line frequency and the sampling rate are two 8-bit counter timers used to determine the timing of certain events. The so-called two-second timer, to be discussed hereinbelow, counts to 256 times the duration of $1/2$ cycle of the AC waveform or 2.13 seconds. Similarly, the so-called nine-minute timer, also to be discussed hereinbelow, counts to 256 times the duration of the two-second timer, or approximately 9.1 minutes. The two-second timer is used to control the flash repetition rate of the visible LEDs. The nine-minute timer is used to control the LCM 10 self-test program repetition rate.

Referring now to FIG. 4, there is shown an example of the communication protocol for data communication between a LCM 10 and a DE breaker 40 when data is being downloaded from a DE breaker 40 to the LCM 10. In FIG. 4, the lower line is a time line with equally spaced intervals beginning with to. Each interval represents the sampling period of 520 microseconds. Above the lower horizontal time line are two sequences of pulses. The upper row of pulses illustrates the data bytes transmitted by the LCM 10 which are transmitted at approximately 1,040 microsecond intervals. The sequence of pulses below the upper row of pulses represents the data bytes transmitted by an individual DE breaker 40. Notice that these pulses are transmitted at equally spaced alternate intervals with respect to the LCM 10 data byte transmissions. FIG. 4 thus shows that individual data bytes are alternately transmitted by first the LCM 10, then the DE breaker 40 with which it is communicating, and so on. This particular illustrative example of the communication protocol was designed using the EIA Standard No. RS-232C for Serial Binary Data Interchange. However, other schemes are possible. For example, the I²C bus, which is a trademark of Phillips Corporation, could also be used to implement the communication bus for data communication between the LCM 10 and a smart breaker such as the DE breaker 40 of the present invention connected to the communication port of the LCM 10. The present invention disclosed herein, however, is not limited by this particular illustrative example. Each of the data byte pulses shown in FIG. 4 includes a complete data byte consisting of a start bit, 8 data bits, a parity bit and a stop bit.

Referring further to FIG. 4, each of the pulses shown in both of the sequences of data bytes are identified with the name of the data byte being transmitted. These identities correspond with the names shown in TABLE A hereinbelow and will be used to describe a typical example of data communication between a LCM 10 and DE breaker 40 connected to the communication port of the LCM 10. Further, just to the left of each data byte pulse in FIG. 4 is shown a numeral indicating the position in the sequence of pulses of that particular data byte pulse. These numerals correspond to the numerals that appear in TABLE A.

TABLE A

COMMUNICATION PROTOCOL

1. LCM 10 sends address (8 bits).
2. DE breaker 40 receives address and sends a random number 0–255.
3. LCM 10 receives the number and echoes back its complement.
4. DE breaker 40 receives the echo and sends its address as an "ok" code.
5. LCM 10 receives the "ok" and then sends an op code.
6. DE breaker 40 receives the op code. If this is a datalog command, breaker sends the byte count.
7. LCM 10 receives the byte count and echoes its complement.
8. DE breaker 40 receives the complement of the byte count and begins sending data one byte at a time.
9. LCM 10 receives a data byte and echoes its complement.

In the above example shown in Table A, if the LCM 10 detects an error at steps 5, 7 or 9, it will disable itself for 50 milliseconds. If, on the other hand, a breaker detects an error at steps 4, 6, or 8, it will reassign itself a random address address between 128 and 255 according to a procedure to be described hereinbelow and then disable itself for a random number of half-cycles.

In operation, TABLE B shown below presents a numerical example of the data bytes that are transmitted between the LCM 10 and the DE breaker 40 that corresponds with the data byte pulse trains shown in FIG. 4. There are two conditions for the transmission of data byte information between a LCM 10 and a DE breaker 40. The first condition occurs when the breaker address is unique; that is, there is not a conflict on the data bus with another DE breaker 40 having the same address. The second case occurs when the breaker address is not unique; that is, there are two or more DE breakers 40 active which have the same address. In such case, the LCM 10 will automatically assign a new address for a particular DE breaker 40 that experiences a conflict with another DE breaker 40 on the data bus. The first breaker assigns itself a new random address between 128 and 255 and programs its delay time for a value of 16 to 47 half-cycles. Similarly, the second breaker also assigns itself a new random address between 128 and 255 and programs its delay time for a value of 16 to 47 half-cycles. The meaning of these statements will become clear after the automatic address assignment feature for the DE breaker 40 is described.

TABLE B

NUMERICAL EXAMPLES

| FUNCTION | LCM | BREAKER |
|---|---|---|
| 1. BREAKER ADDRESS IS UNIQUE: | | |
| brk_adr | 0×03 | |
| random_num | | 0×51 |
| -random_num | 0×AF | |
| -brk_adr | | 0×FD |
| log_command | 0×96 | |
| byte_count | | 0×10 |
| -byte_count | 0×F0 | |
| data1 | | 0×23 |
| -data1 | 0×DD | |
| data2 | | 0×82 |
| -data2 | 0×E7 | |
| data16 | | 0×66 |
| -data16 | 0×9A | |
| acknowledge | | 0×C5 |
| 2. BREAKER ADDRESS IS NOT UNIQUE: | | |
| brk_adr | 0×03 | |
| random_num_1 | | 0×51 |
| random_num_2 | | 0×72 |
| -random_num | 0×B0 (logic 0 overrides a logic 1) | | breaker_1 assigns itself a new random address between 128 and 255 and programs its delay time for a value of 16 to 47 half-cycles.
breaker_2 assigns itself a new random address between 128 and 255 and programs its delay time for a value of 16 to 47 half-cycles.

Continuing with FIG. 4, each of the DE breakers 40 connected to an LCM 10 is assigned a unique address. The addresses can be assigned when the DE breaker 40 is manufactured, or the address can be assigned automatically after the DE breaker 40 is installed in a system with a LCM 10. Thus, in a system including a plurality of DE breakers 40 connected to the communication port of a LCM 10, each DE breaker 40 in a panel will have a unique address. In the illustrative example given below, the range of addresses is zero to 127.

At the factory, individual DE breakers 40 will be assigned temporary numbers in the range of 128 to 255. A value with bit 7 turned on indicates, for example, that the breaker has not been installed in a panel with a LCM 10, before being assigned a permanent address between 0 and 127. However, during the installation process, which may require resolution of address conflicts, individual DE breakers 40 may be assigned temporary addresses between 128 and 255 by the LCM 10. There are 8 conditions which govern the assignment of address numbers to individual DE breakers 40 by the LCM 10. Each can be described in successive paragraphs 1–8.

CASE 1: A new DE breaker 40 is installed in an existing panel. In this case, the LCM 10 finds the new DE breaker 40 during a scan of all possible addresses between 0 and 255. The new DE breaker 40 is then assigned an unused number between 0 and 127.

CASE 2: Several new DE breakers 40 are installed in an existing panel. Some of these addresses may be in conflict. In this situation, when conflicts are encountered, the DE breakers 40 involved will assign themselves new, temporary random addresses in the range of 128 to 255. This reassignment continues until no conflicts exist. When the situation where no conflicts exist is reached, the LCM 10 will assign new permanent addresses in the range of 0 to 127 to each of the DE breakers 40.

CASE 3: A used DE breaker 40 is installed in an existing panel. When a data conflict is noticed while communicating with a particular address, the two conflicting DE breakers 40 involved will reassign themselves random, temporary addresses between 128 and 255. These addresses may still be in conflict, in which case the reassignment continues for additional cycles. After conflicts have been eliminated, the LCM 10 will assign new addresses just as in case 3 above.

CASE 4: Several used DE breakers 40 are installed in an existing panel. The conflicts will be resolved just as in Case 2 above.

CASE 5: A new LCM 10 is installed in a panel. The LCM 10 will scan all addresses and make an internal list.

CASE 6: A used LCM 10 is installed in a panel. The internal address list is not valid in this situation. The LCM 10 will scan the list of stored addresses first. Addresses corresponding to DE breakers 40 that don't exist will be deleted. Then, all the other addresses will be scanned, looking for new DE breakers 40. This time, it is assumed there are no conflicts because only the LCM 10 has been changed.

CASE 7: A DE breaker 40 is removed from a panel. The LCM 10 notices the DE breaker 40 is not responding. It then blinks its red light and beeps until the LCM's 10 clear button is pressed. Then, the DE breaker 40 is deleted from the active list.

CASE 8: The LCM 10 is removed from a panel or a used DE breaker 40 is installed in a panel without a LCM 10. In this case, after ten minutes without being logging by an LCM 10, a DE breaker 40 with a valid address. Blinks its red LED with a special code indicating a communication failure. This LED continues to blink until an LCM 10 is installed.

Communication between the LCM 10 and DE breakers 40 will now be described The LCM 10 is the master and will initiate all data transactions. It begins by first sending an 8-bit address databyte. When a DE breaker 40 or several DE breakers 40 responds, that DE breaker 40 will send an 8-bit random number obtained from an internal free-running counter. Since the oscillators in the DE breakers 40 are not synchronized, their counter data will generally be different. However, there is a 1 in 256 chance that they will be the same. Next, the LCM 10 receives the data byte and sends back its two's compliment for the DE breaker 40 to verify that it is unique. If a conflict exists, one or more of the DE breakers 40 will respond as though the data is in error. In that case, the DE breaker 40 will reassign itself a new temporary address in the range of 128 to 255 using a number from the free-running counter. The DE breakers 40 will also be looking for conflicts during the transmission of data log information. Each data byte sent by a DE breaker 40 will be echoed back by the LCM 10. If a DE breaker 40 notes an error, it will reassign itself a new address. If, later, the LCM 10 notes that the DE breaker 40 is missing, the DE breaker 40 will be located when the LCM 10 scans the data bus looking for new DE breakers 40. If a DE breaker 40 formerly had a valid address, it will send that address to the LCM 10 first (otherwise it sends a zero), so that LCM 10 can update its table and merge the new data with the old data for that DE breaker 40.

The foregoing description provided information on the communication protocol used in the LCM 10 network system with a plurality of DE breakers 40 to illustrate how information is exchanged between the LCM 10 and the DE breakers 40 connected to the communication port of that LCM 10. The principle purpose of this communication protocol is, however, to send parametric data from individual DE breakers 40 in response to a command from the LCM 10. An example of the protocol for transferring this data is given in TABLE C below. TABLE C presents an example of intercommunication between the LCM 10 and a DE breaker 40 in much the same pattern that was illustrated in TABLE A. In fact, a generalization can be drawn in the following way. If data is being transmitted from a DE breaker 40 to a LCM 10, the LCM 10 echoes the data byte transmitted by the DE breaker 40. Similarly, if data is being transmitted from the LCM 10 to a DE breaker 40, the DE breaker 40 echoes the data byte transmitted by the LCM 10.

TABLE C

PARAMETRIC DATA PROTOCOL EXAMPLE

1. LCM 10 sends command 0×6D
2. Breaker echoes -0×6D
3. LCM 10 sends byte count
4. Echo -byte count
5. LCM 10 sends register address to put the data
6. Echo -address
7. LCM 10 sends data byte
8. Echo -data
9. LCM 10 sends ACK 0×D9

In the present embodiment, there are defined 22 bytes for DE breaker 40 parameters that can be saved by a LCM 10. These bytes are defined in TABLE D below.

TABLE D

BREAKER PARAMETERS SAVED BY LCM

Data record format: 22 bytes total
1. 6 bytes:
   DateTime: Date and time this record was saved.
   Year, month, day of month (dom), hour, minute, second
2. 1 byte.   MY_ADR
   Breaker ID number.
3. 1 byte:   LOG_CODE
   Record_type:  1 = standard periodic datalog.
                 2 = delta_I > MIN_DELTA_I.    (significant load current change)
                 4 = delta_V > MIN_DELTA_V.    (significant line voltage change)
                 8 = breaker status change.    (tripped; or self-test failure)
                 16 = AC main power turned on/off
   NOTE: Record_type may have more than one bit on at a time.
4. 1 byte:   MAX_ARC
   Maximum value of the arc_accumulator during the data log interval.
5. 1 byte:   IAVG2
   Value in the current averaging digital capacitor which has a time constant of 2 seconds.
6. 1 byte:   IPKCYCLE
   Max value of current during this half-cycle.
7. 1 byte:   IPREVPK
   Max value of current during the previous half-cycle.
8. 1 byte:   IMAX_LOG
   Peak current found during this logging interval.
9. 1 byte:   I_SOAK2
   Soak current value when this record was stored.
   Time constant is 68 seconds.
10. 1 byte:  IG_PEAK
    Peak current since main AC power was turned on.
11. 1 byte:  VAC
    Max line voltage found during last half-cycle.
12  1 byte:  ARC_ACCUM
    present accumulated value found in arc register. 0–255.
13. 1 byte:  GFI_PP
    Ground Fault current, peak to peak.
14. 1 byte:  FLAG
    Breaker_status:   An 8 bit flag word that shows whether the breaker
                      is tripped or if the self-test has failed.
    (bit_0=LSB.)
    bit_4=1 =>    tripped
    bit_5=1 =>    self-test min current > 20 amps.

TABLE D-continued

BREAKER PARAMETERS SAVED BY LCM

|  |  |  |  |  |
|---|---|---|---|---|
|  | bit_6=1 => | self-test 100 amp reading was low. | | |
|  | bit_7=1 => | self-test Triac trip signal nonfunctional. | | |
| 15. 1 byte: | TRIP CODE: | | | |
|  | This byte is set to a coded value when a trip occurs, indicating what caused the breaker to trip. | | | |
|  | Number of Red LED Flashes | Failure Code Sent to LCM 10 | Description | |
|  | (1) | 129 | Communiunication failure. | |
|  | (1) | 131 | Manual trip. | |
|  | (1) | 133 | IAVG greater than TRIPLIMIT. | |
|  | (2) | 135 | Arc detected. | |
|  | (3) | 137 | Manual test button pressed longer than 2 seconds. | |
|  | (4) | 139 | External trip command via RS232. | |
|  | (5) | 141 | ADC reading greater than TRIP_IMMED value. | |
|  | (6) | 143 | Hissing Arc. | |
|  | (7) | 145 | GFCI trip. | |
|  | (8) | 147 | High current arc detected. | |
|  | (10) | 151 | Excessive contact temperature. | |
|  | (11) | 153 | Overflow from IAVG2 during current averaging. | |
|  | (12) | — | Invalid trip code. | |
| 16. 1 byte: | RESP_MODE | | | |
|  | Breaker_mode: A number from 0..3 indicating the mode switch settings: | | | |
|  | 11 = Standard response curve. | | | |
|  | 10 = Response curve 2. | | | |
|  | 01 = Response curve 1. | | | |
|  | 00 = Response curve 0. | | | |
| 17. 1 byte: | VERSION | | | |
|  | Program version: A number indicating the software version. | | | |

Figure 5:
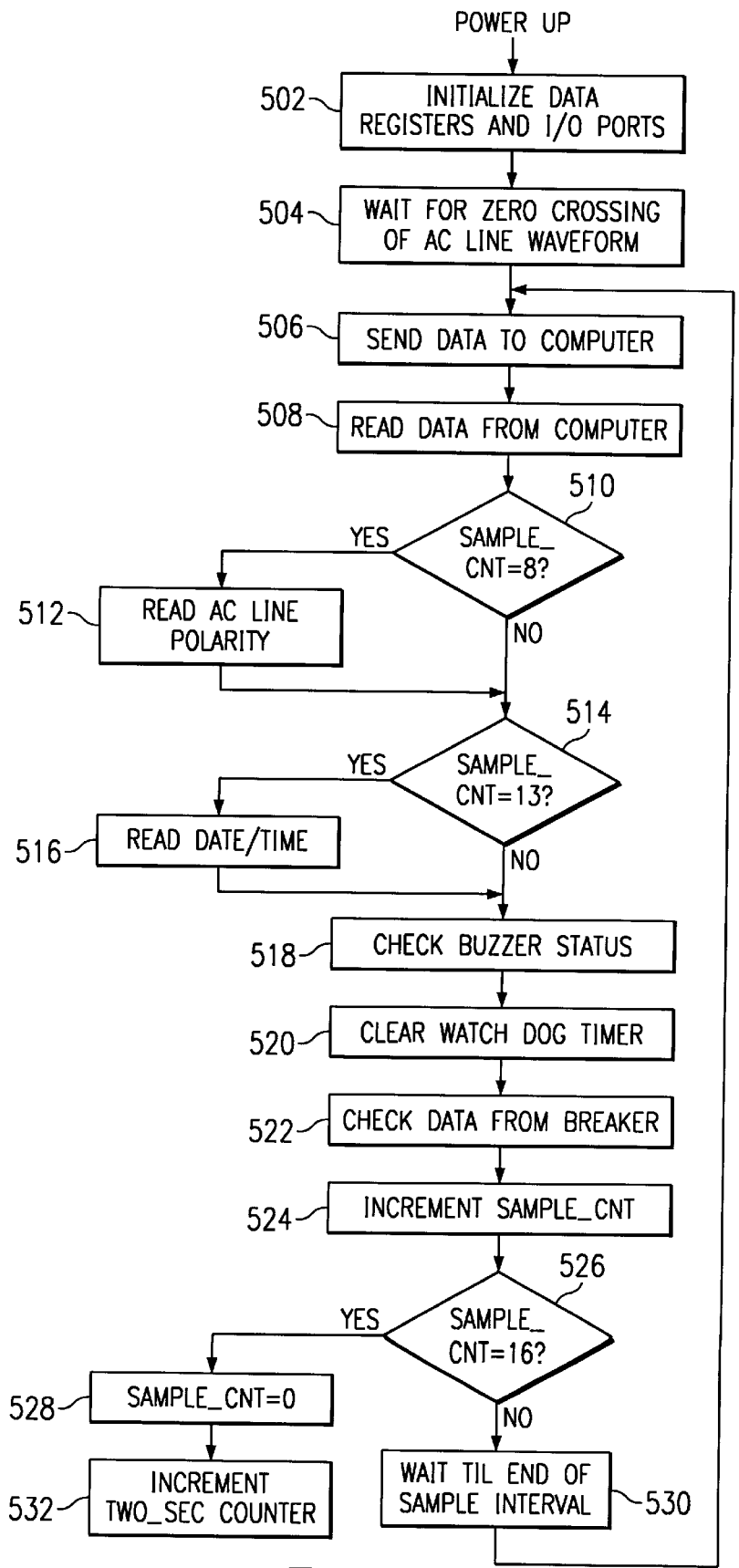
FIG. 5 is a flow chart of the Main Program Routine in the Load Center Monitor.

Referring now to FIG. 5, there is illustrated a flow chart for the main LCM 10 program. This program is initiated at a function block 502 which follows power-up of the LCM 10 system. Function block 502 performs initialization of data registers and I/O ports in the LCM 10 following power up. Following initialization, the flow proceeds to function block 504 where the system waits for a zero-crossing of the AC line waveform. A zero-crossing signal is responsive to the arrival of a zero-crossing event at pin RC5 of CPU 76 in the LCM 10. It will be appreciated at this point that the zero-crossing event is the data event for the operation of the programs within the LCM 10 as was previously discussed in conjunction with FIG. 2 and FIG. 4. Following the zero-crossing event, the flow proceeds to function block 506 to execute a sub-routine for sending data to a computer (computer) connected to one of the I/O ports of the CPU 76 in the LCM 10. As was described previously, a computer can be connected to either the user port 20 or the service port 22. Data communications with a computer on either of these I/O ports may typically be using the RS 232C standard for Serial Binary Data Interchange. Typically, data is sent from the LCM 10 to the computer on request or in response to a command from the remote computer. Thereafter, the flow proceeds to function block 508 to read data from a computer. Data being read from a remote computer may be in the form of commands to execute certain operations or from data being downloaded from the computer to the LCM 10. This functional block 508 will be described in greater detail in conjunction with FIG. 6 to be described hereinbelow.

Previously, it was described that the sampling clock rate was synchronized with the zero-crossing periods, that is, with the intervals between zero-crossings of the AC line waveform. For example, the sampling rate was shown to be 16 samples taken every half-cycle of the AC line waveform. The timing of numerous events in the main program sequence is related directly to which particular sample is being output at a given instant. There is a counter in the LCM 10 which keeps track of the number of samples that have transpired since the last zero-crossing. Thus, at various points within the main program, there will be a function block that will identify a particular sample count.

Returning now to the FIG. 5 description, the flow proceeds from function block 508 to function block 510 where the system checks to see if the sample count is equal to eight. This sample count value is important because it occurs at the peak value of the incoming AC line waveform that is monitored at pin RC5 at CPU 76 which is the input to the zero-crossing detector. If the sample count value is eight, that is the answer to the question is a "Y" or a yes, the flow proceeds to function block 512 where the LCM 10 will read the AC line polarity. If the sample count is not eight, then the flow proceeds from function block 510 along the line labeled "N" for no to the following function block 514. A no response in block 510 means that the sample count is not eight and it is not at a peak value of the AC waveform. Function block 514 similarly checks to see if the sample count is equal to thirteen. The value 13 for the sample count signifies that a zero-crossing event is approaching within a few count values. If the sample count does equal thirteen, then flow proceeds along the "Y" line to function block 516 to read the day and time from the realtime clock. This step in the main LCM 10 program takes approximately 100 microseconds. If the sample count value was not thirteen in function block 514, then flow proceeds along the "N" line where it joins with the output of function block 516 to enter the next function block 518 in which the buzzer status is checked. At function block 518, if data is present in the buzzer status register, then the program routine will be interrupted and will process the data that is present in that register. Otherwise, if there is no data in the buzzer status register, then flow will proceed with the main routine and enter step 520. At step 520, the LCM 10 program will clear the watchdog timer. As is well known in the art, a watchdog timer provides a means of exiting a program and restarting at the initialization step if for some reason the microprocessor is hung up in the routine at some point. In the preferred embodiment of the LCM 10 in this illustrative example, the time value of the watchdog timer is set to at least one sampling cycle, that is; approximately 16 times the 520 microsecond sampling interval for a total of 8.33 milliseconds which is the interval between zero lines of the AC wave line. Other intervals may be used, of course, but it will be appreciated that this value for the watchdog timer is a convenient one in this particular application. Thus, the purpose of function block 520 is to clear whatever value of time is in the watchdog timer counter, and proceed to the following function block 522.

Proceeding with FIG. 5 in function block 522, a step is provided to check the data from the DE breaker 40. If data is present in the data buffer that was input from the DE breaker 40, the main program will be interrupted and the LCM 10 will process the data in the data buffer. If there is no data from a DE breaker 40 in the data buffer, the main program will not be interrupted and the program will then flow to function block 524. In function block 524, the routine increments the sample counter from the current value. Following function block 524, the program will flow to function block 526, where the program checks to see if the sample count value is equal to sixteen. A sample count value of sixteen means that the sampling cycle has reached the end of a sampling cycle in that particular interval between zero-crossings. Therefore, the zero-crossing event will follow immediately upon the end of the sixteenth sample. If the result of the test in function block 526 is "Y" or yes, then the sample count is set to "0". If the result of the sample count test is in function block 526 "N" or no, then the flow proceeds to function block 530, where the program will wait until the end of the sample interval before it flows back to function block 506 or the SEND DATA TO COMPUTER function block. It will be appreciated that if the sample count has not yet reached sixteen, then the program routine must return to an earlier point in the program so that the next sample interval may be accomplished. If, on the other hand, the sample count was sixteen and flow proceeded to function block 528 where the sample count was reset to "0", then flow proceeds further to the function block 532. The purpose of function 532 is to increment the two second counter in the LCM 10. The purpose of the two second counter is to control the LED flashing rate that is part of the visible and audible alarm operation within the LCM 10. This function block 532 will be described in greater detail in conjunction with FIG. 8.

Returning to function block 522 where the program checked data from the DE breaker 40, this step is described in further detail in FIG. 7, and will be described hereinbelow.

Figure 6:
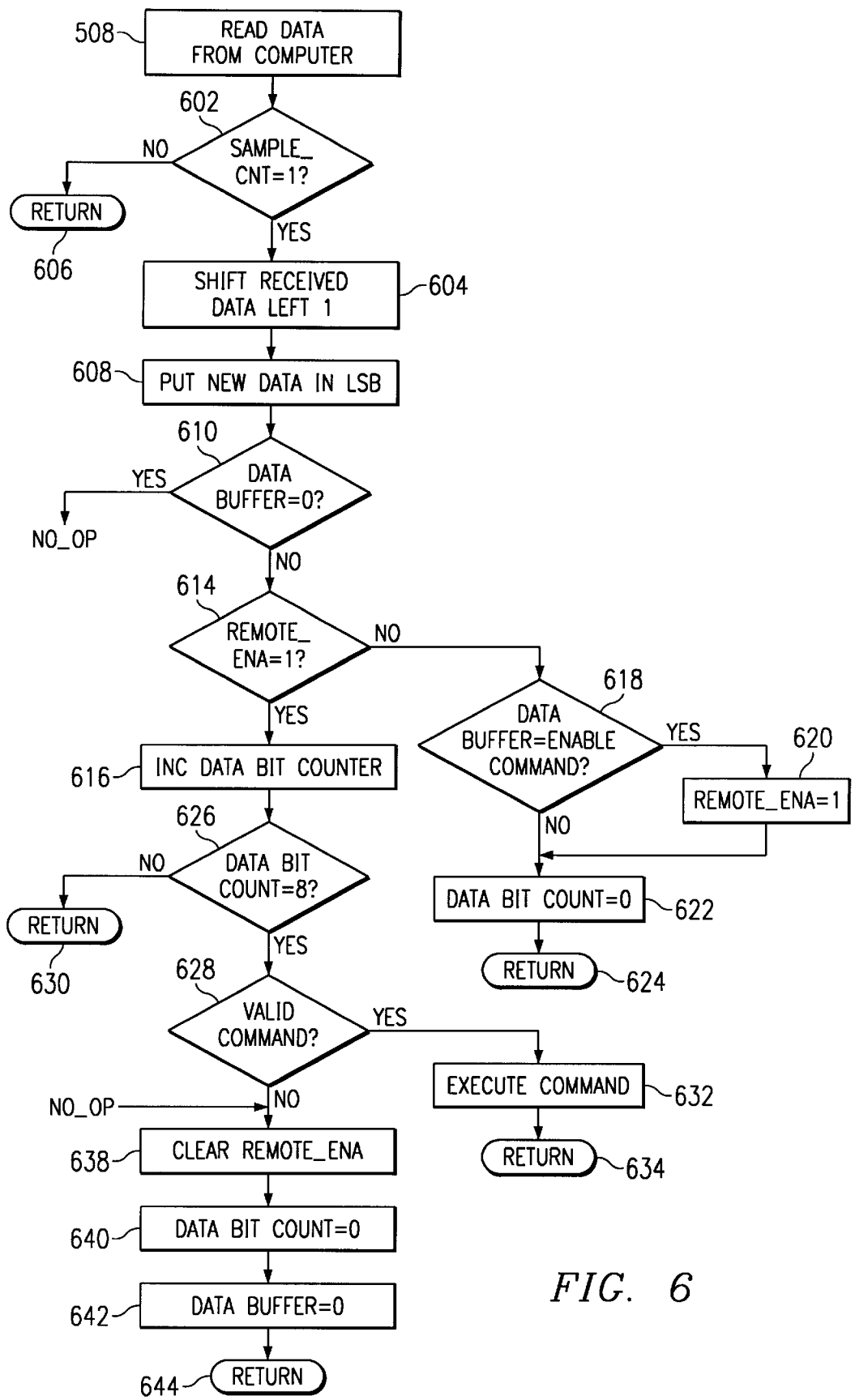
FIG. 6 is a flow chart diagram showing the Remote Data Read Routine for reading data from computer connected to the Load Center Monitor.

Referring now to FIG. 6, there is illustrated a flow chart depicting the Remote Data Read Routine. This routine begins with function block 508, part of FIG. 5, entitled READ DATA FROM COMPUTER. During this step, flow proceeds to function block 602, where the sample count is checked for a value of "1". If the value is "1" then flow proceeds along the "Y" line to function block 604. At function block 604, the program shifts any received data left by one place. If the result of the sample count check is not "1", then flow proceeds along the "N" line to function block 606, to return to the main program at function block 510. Returning now to the remote data read routine of FIG. 6, when the data received has been shifted left by one place, the program then flows to function block 608 where the routine enters the new data in the least significant bit (LSB) buffer 609. As is well understood by those skilled in the art the most significant or the highest valued bit is the left most bit in a binary data word; similarly, the least significant or smallest valued bit being the right-most bit of an 8-bit data word. Thus, in function block 608, the new data is entered into the LSB buffer 609; that is, the current bit is entered into the right-most position. As other bits are entered, the current bit is shifted to a more significant position. Following entry of the new data into the LSB 609, flow proceeds to function block 610. The remaining steps contained in FIG. 6 are concerned with determining whether, first, the data buffer contains a command and, second, whether the command is a valid command.

Referring again to FIG. 6, beginning with function block 610 in which the system checks the data buffer for a "0". If the data buffer is equal to all "0's", i.e., a computer is not present on either of the I/O ports of the LCM 10, then a non-operative condition (NO__OP) exists and the program will jump ahead to function block 638. Thus, if the data buffer is "0", then operation flows along the "Y" line indicating a NO__OP condition to function block 638. If, however, there is data in the data buffer, that is it is not "0", then flow proceeds along the "N" line to function block 614, where the system determines whether or not the remote computer is sending an enable bit to the LCM 10. Thus the program executes the step of REMOTE ENA=1. When a remote computer sends the code interpreted as an enable bit, it is in effect saying to the LCM 10 "I am enabling you to receive a command." The purpose of the enable command is to prepare the LCM 10 to read data from the external remote computer via one of the I/O ports. This step is a procedural redundancy in the main program routine to make sure that noise on the data line, which may exist from time to time, is not interpreted as data from the remote computer. If the system determines in function block 614 that there is not an enable bit from the remote computer present on the I/O, then the program will flow to function block 618 where the system checks to see if the data buffer contains an enable command. If an enable command is present in the buffer then the system in function block 620 checks to see if the remote enable value is equal to "1". If the value is equal to "1" then the data bit count is set to "0" in function block 622. If the data buffer does not contain an enable command, the flow proceeds along the "N" line to function block 622 where the data bit count is set to "0" and flow proceeds to function block 624. Function block 624 depicts the flow returning to the main program at functional block 510 shown in FIG. 5.

Returning now to function block 614 in FIG. 6, the Remote Data Read routine, if it was determined that the remote enable bit has a value of one, that is there is an enable bit from the remote computer, then flow proceeds along the "Y" line to optional function block 616 where the data bit counter is incremented by one step. Following function block 616 the program then proceeds to function block 626 where the system checks to see if the data bit count is equal to eight. If the data bit count is not equal to eight, which means that there is not a complete byte in the data bit counter, then flow proceeds along the "N" line to return to the main program in function block 510 in FIG. 5. If the data bit counter is full, that is there are eight bits present, then flow proceeds along the "Y" line to function block 628 where the system checks to see whether the command that is present there in the data bit counter is a valid command. If the system determines that the command that is present in the data bit counter is a valid command at function block 628, then flow proceeds along the "Y" line to function block 632, where the system executes the command. Following the execution of the command, the program flows to function block 634 where the program returns to the main routine in FIG. 5, at function block 510. If the command is found to be invalid in function block 628, the program flows along the "N" line function block 638, where the system will clear the remote enable data from the data bit counter. It will be recalled from the previous function block 610, if the data buffer was found to be "0," then the program will flow along the NO_OP line directly from function block 610 to function block 638 where the data bit counter is cleared of any data indicating a remote enable bit. The program then flows to function block 640 where the data bit counter is set to "0" thereafter flowing to function block 642 where the data buffer is also set to "0" and thereafter returning to the main program at step 510.

Figure 7A:
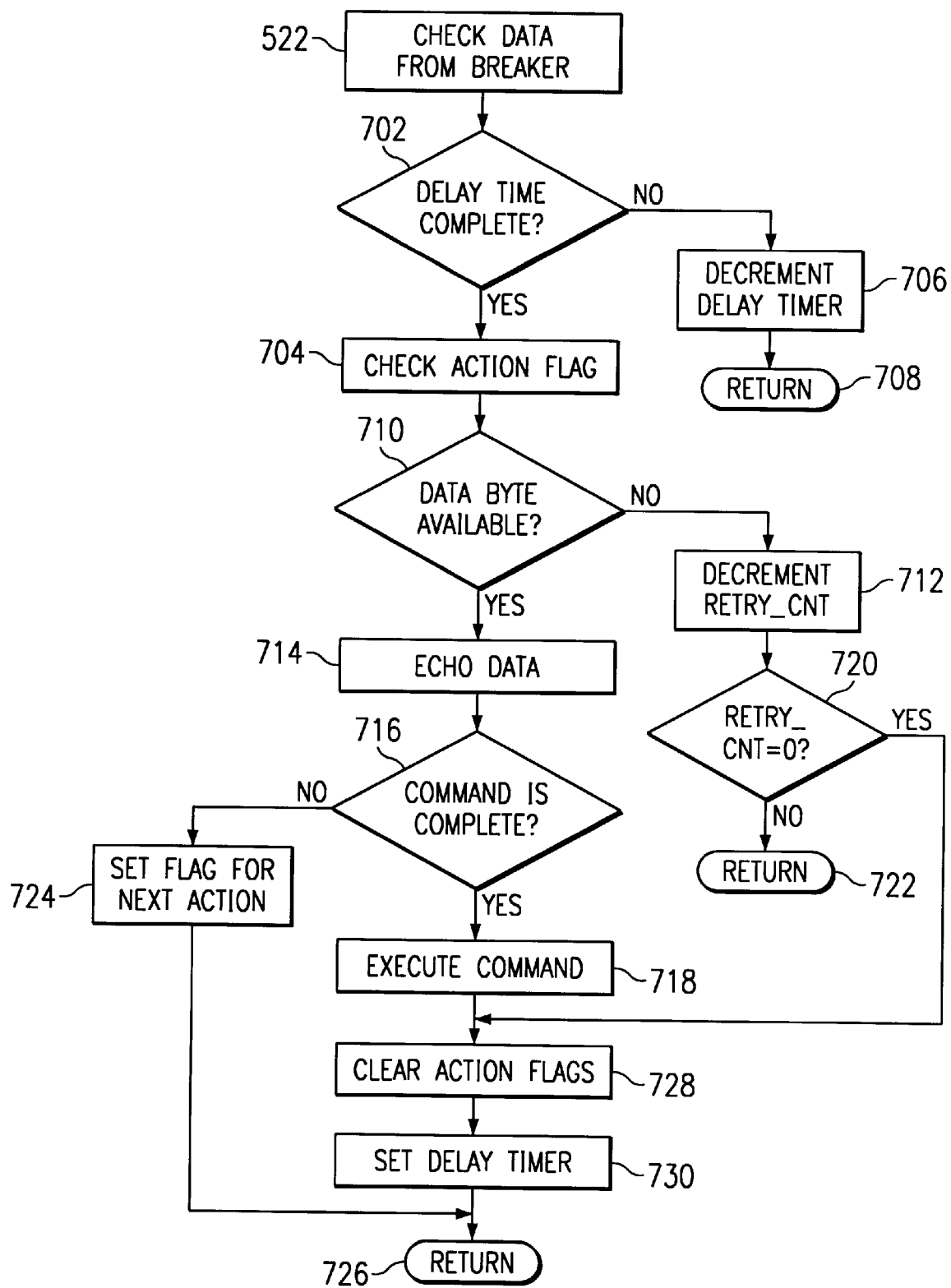
FIGS. 7A and 7B illustrate flow charts for the Digitally Enhanced Breaker Data Read Routine.

Referring now to FIG. 7A, there is illustrated a flow chart for the DE Breaker Data Read routine. This program is initiated at function block 522 shown in FIG. 5, labeled Check Data From Breaker. The purpose of this step is to check data, whether there is data in the buffer; then the main program routine is interrupted in order to process the data. That is, the system will go to function block 702. If there is no data present in the data buffer from the DE breaker 40 then the program will flow to function block 524 in the main routine. Returning to FIG. 7A, the flow then proceeds next to the function block 702 in which the system checks to see if the delay time is complete. The delay time is an operation performed by the LCM 10 to, in effect, tell any other DE breakers 40 that are connected to the communication port to stay off the line, that is to just listen to the LCM 10 so that the LCM 10 has time to initiate communication by sending an address to the DE breaker 40 with which it wishes to communicate. In the preferred embodiment of LCM 10 of the present invention, the value of the delay timer is set to at least several times the sampling interval. In this particular illustrative example, the value of the delay timer is set to approximately 100 times the sampling interval, or approximately 100 milliseconds. In function block 702, if the delay time is not complete, flow proceeds along the "N" line to function block 706 where the delay timer is decremented by one step. Thereafter flow proceeds to function block 708 in which the program returns to the main program, that is, to function block 524 in the main program shown in FIG. 5. If, however, the delay time is complete, that is, the entire delay timer sequence has timed out then flow proceeds along the "Y" line from function block 702 to function block 704 where the program checks for the presence of an action flag. The action flag in the present embodiment of the LCM 10 is defined to have two different bytes of data. In other words, each of the sixteen bits of data in the action flag register is defined to indicate what happens in the next step in a particular part of the routine. In other words, at selected points within the program routine, an action flag bit indicates the position of that point in the sequence. It is used for monitoring the action of the program or for trouble shooting. When the system has checked the action flag in the DE Breaker Data Read routine, the program then flows to function block 710 to check whether a data byte is available. Function block 710 tests whether a data bit has been received by the DE breaker 40 in the hardware register in either the LCM's microcontroller or in the DE breaker's 40 microcontroller. If this bit tests affirmative, then the program flows along the "Y" line to function block 714 where the LCM 10 will echo the data that is present in the data buffer register. If a data byte is not available then flow proceeds from function block 710 to function block 712 where the system will decrement a retry counter and the flow thereafter proceeds to function block 720. In function block 720, the system checks whether the retry counter value is "0". If the value is not "0" then the system returns to function block 524. If the retry counter is equal to "0" no further effort will be made to determine if a data byte is available and the program flows along the "Y" line from function block 720 to function block 728. There the system clears all action flags and flows to block 730 where the system will set the delay timer and return to the main program in function block 726.

Returning to function block 710, if it was determined that a data byte is available, then flow proceeds along the "Y" to function block 714 where the LCM 10 will echo the data to the DE breaker 40. The program will then flow to function block 716, where the system asks if the command is complete. If the command is not complete, the program flows along the "N" line to function block 724 where the LCM 10 will set the flag for the next action. Thereafter, the program will flow to function block 726, where the DE breaker Data Read routine returns to the main program, that is function block 524 shown in FIG. 5. Returning to function block 716, if the command is found to be complete, then the program flows along the "Y" line to function block 718 where the LCM 10 will execute the command followed by clearing the action flags in function block 728 and setting the delay timer in function block 730. Thereafter, the program will flow to function block 726 where the DE breaker Data Read routine returns to the main program.

Figure 7B:
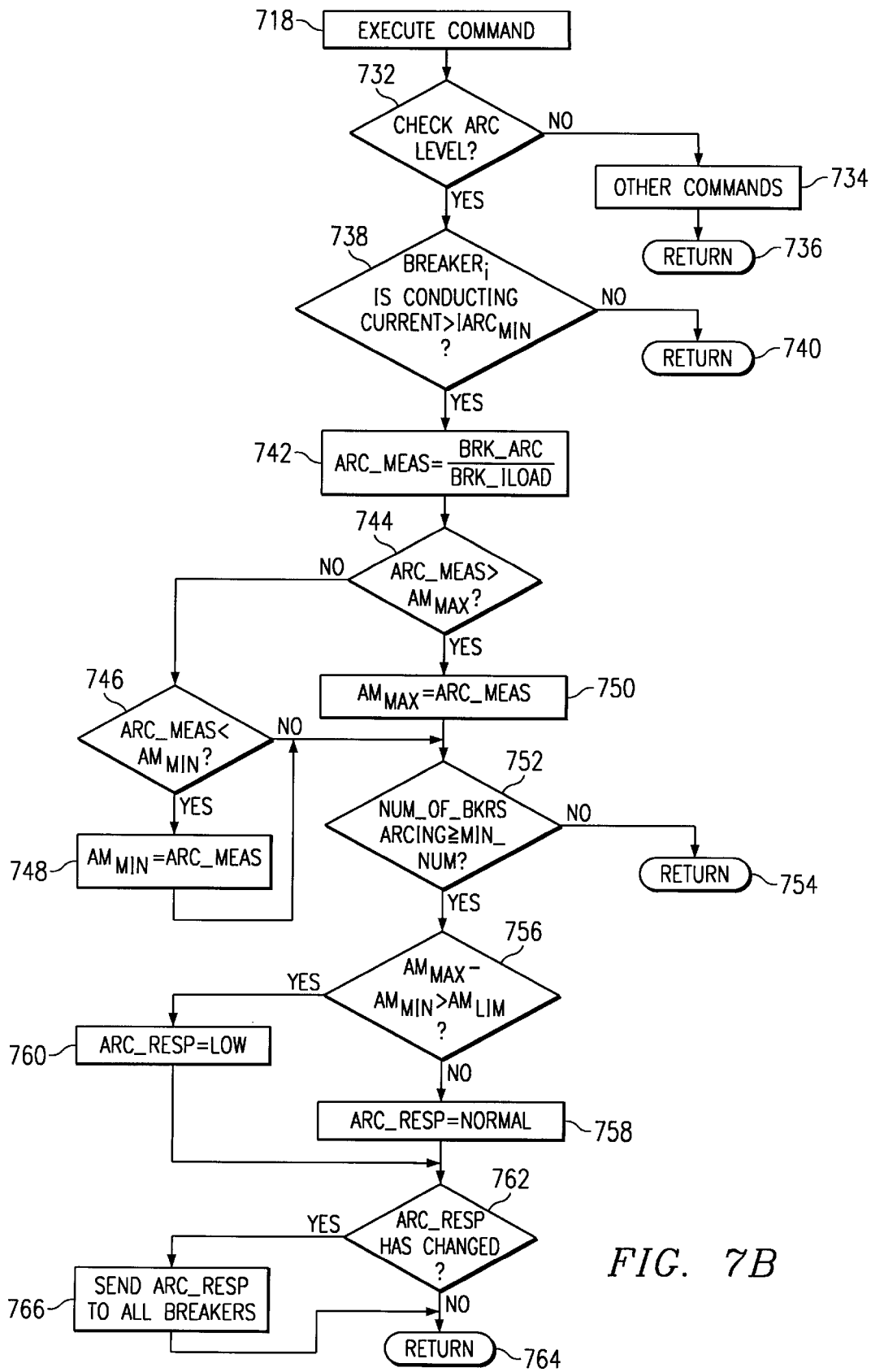

Referring now to FIG. 7B, the program flow for reducing the arc sensitivity of an individual circuit breaker will now be described. In a network of DE breakers 40 connected to a common power line source, arcing of conductors in the main power line circuit can lead to inconsistent performance of individual circuit breakers. Arcing can also be a fire hazard which must be eliminated and/or made known to emergency personnel. In some situations arcing may be a normal operating characteristic of a load deice, to the arc sensitivity of the DE breaker 40 needs to be revised to accommodate that characteristic. The LCM 10 of the present invention, when connected in a network comprised of a plurality of DE breakers 40, is programed to analyze data from these individual DE breakers 40 to determine if an arc indication from several DE breakers 40 requires a change in the arc sensitivity of the breakers in the system. The program routine in the LCM 10 for accomplishing this purpose is illustrated in FIG. 7B.

The flow in FIG. 7B begins with block 718 entitled EXECUTE COMMAND. It will be recalled that block 718 is one of the blocks illustrated in the Flow Chart of FIG. 7A. The program flow to execute a command from the DE breaker 40 begins with block 732 which checks the arc level. If there is no arcing level indicated, then flow proceeds to block 734 where the system checks other commands, and thereafter returns to the main program in block 736. If, however, the system, when checking the arc level, indicates that an arc level is present, then flow proceeds along the "Y" line from block 732 to block 738 where the DE breaker 40 which is indicating the presence of an arc is tested by the LCM 10 to see if that DE breaker 40 is conducting a current which is greater than a predetermined value of the minimum arcing current, $I_{ARC\ MIN}$. This test is performed to determine whether the current level is large enough to make a meaningful measurement. If it is not, the flow proceeds along the end line to block 740 and returns to the main program in FIG. 7A. If, however, the arcing current measured by the individual breaker is above the minimum level necessary for making a meaningful measurement, then flow proceeds along the "Y" line to block 742.

The purpose of block 742, is to normalize the arc indication from the individual DE breaker that is reporting an arc. The LCM 10 performs this normalization by dividing a quantity stored in memory representing an integrated sum of the arcing events time the average DE breaker 40 load current by the average DE breaker 40 load current. This normalized value is called "ARC MEAS" for ARC MEASURE. After dividing the quantity breaker arc by a quantity breaker current load in the individual circuit breaker, the LCM 10 uses the resulting value for ARC MEASURE and the flow proceeds to block 744 where the measured value is compared with a value for the maximum ARC MEASURE. If this value is not greater than ARC MEASURE MAXIMUM then flow proceeds along the end line to block 746 where the value for ARC MEASURE is compared with the minimum ARC MEASURE value stored in memory. If the value of ARC MEASURE is less than the minimum ARC MEASURE value, then the flow proceeds along the "N" line to block 752. If the value of ARC MEASURE is not less than the minimum value of ARC MEASURE, then flow proceeds along the "Y" line to another block 748, where the minimum value for an arc measured is set equal to the ARC MEASURE value. Returning to block 744, if the test performed there to determine whether the ARC MEASURE value exceeds the maximum ARC MEASURE value, then flow proceeds along the "Y" line to block 750 where the maximum ARC MEASURE value is set equal to the ARC MEASURE value received from the breaker.

The flow in FIG. 7B thereupon proceeds along a line to block 752. The purpose of block 752 is to collect the data from individual DE breakers 40 that are reporting arcing and to collect the results of the tests that measure the value of the measured arc and compare it to the minimum and maximum values. Block 752 in the program routine uses this information to analyze the arcing status of all the individual breakers in the system and ignore any arcing unless several DE breakers 40 are reporting arcing. The reason for this is that, unless arcing occurs in more than a minimum number of breakers, the arcing phenomenon or condition is not an upstream condition and no action to reduce the arc sensitivity of any of the breakers in the system is warranted. Thus, if the number of breakers reporting arcing is not greater than or equal to the minimum number established as a triggering point, then flow proceeds from block 752 along the "N" line to block 754 where the program operation returns to the main program. If, however, the number of breakers that are reporting arcing is greater than or equal to the minimum number, then flow proceeds along the "Y" line to block 756 where the LCM 10 checks the range of arcing values that have been reported by the individual DE breakers 40 in the system. This test compares the difference between the ARC MEASURE maximum and minimum values described hereinabove and compares it with an ARC MEASURE limit value. If the range of measured arcing values is greater than the limit value, then flow proceeds along the "Y" line to block 760. If, however, the measured range of arcing values is not greater than the limit value, then flow proceeds along the "N" line to block 758. In block 758, the measured range of arcing values is called the "ARC RESPONSE" and it is determined that it is normal in block 758. Thereupon, flow proceeds to block 762. If, however, the range of arcing values is greater than the limit value measured in block 756, then flow proceeds along the "Y" line to 760 where the arc response is determined to be low, meaning that the breaker sensitivity should be reduced in order to avoid nuisance tripping at that individual breaker. Following this determination, flow proceeds to block 762. In block 762, the LCM 10 checks to see if the ARC RESPONSE level has changed. If the answer to that comparison is "no", then flow proceeds along the "N" line to the return block 764. If, however, the ARC RESPONSE has changed, then flow proceeds along the "Y" line to block 766. Here the LCM 10 updates the arc sensitivity in the breakers by sending the ARC RESPONSE value to all breakers in the system. All breakers in the system receive this updated arc sensitivity because arcing in a upstream condition will effect all breakers, therefore all breakers should receive the updated arc sensitivity information.

The purpose of the program routine illustrated in FIG. 7B, is to determine the most appropriate arcing response of all of the individual DE breakers 40 in the system connected to the LCM 10. This arcing response determination is an independent function of the LCM 10 and is not associated with the adaptive updating of the data constants that make up the trip profile that is stored in the memory of the individual DE breakers 40.

Continuing further with FIG. 7B, the program routine described hereinabove is an example of the kind of analysis functions performed in the LCM 10 previously described. Also, previously described were functions performed by the LCM 10 in which the LCM 10 adaptively reconfigures the trip profiles in individual DE breakers 40. It will be appreciated that, since the trip profiles referred to control the operation of the DE breaker 40 during the normal current overload mode, the adaptive reconfiguration function performed by the LCM 10 applies to the current overload mode.

Figure 8:
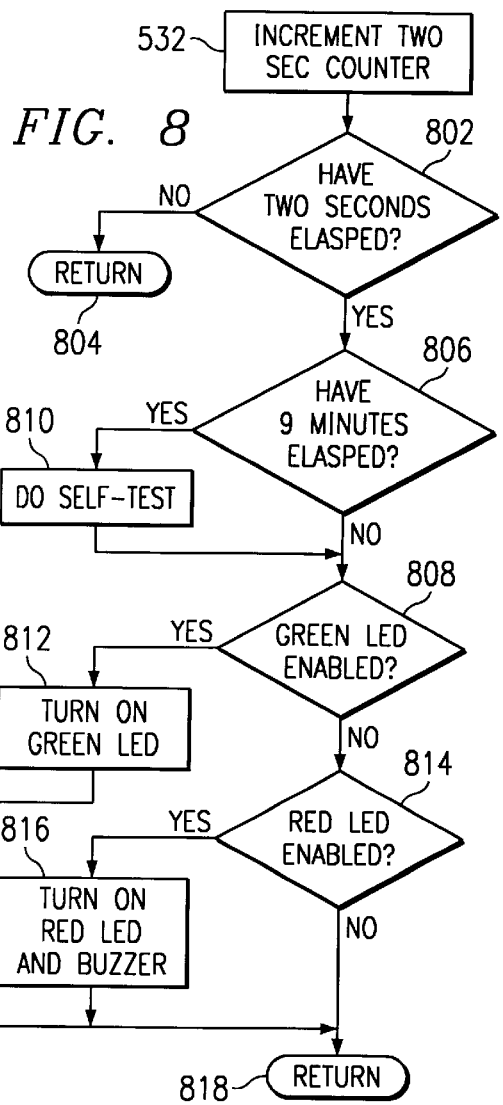
FIG. 8 illustrates a flow chart diagram for the Audible and Visible Indicator Routine in the Load Center Monitor.

Referring now to FIG. 8, there is illustrated the Audible and Visible Indicator Routine. This program routine is initiated at the function block 532 shown in FIG. 5 where the system increments the two second counter. As was explained previously, the two second counter is used to time the flashing rate for the visible and audible indicators. Thus, in function block 532 the program flows to function block 802 shown in FIG. 8 where the system makes a determination as to whether two seconds have elapsed. If two seconds have not yet elapsed then flow proceeds along "N" line to function block 804, where the routine returns to the main program at function block 504 shown in FIG. 5. If, however, two seconds have elapsed then flow proceeds along the "Y" line to function block 806 where the system determines if nine minutes have elapsed. If nine minutes have elapsed, then the flow proceeds along the "Y" line to function block 810 where the system performs the self-test routine. This is the function of the nine minute timer, to determine when the self-test routine should be performed in the system. Upon completion of the self-test routine in function block 810, the program flows to function block 808 where the system determines whether or not the green LED has been enabled. Returning to function block 806, if nine minutes have not elapsed then flow proceeds along the "N" line to function block 808 where the system determines whether the green LED has been enabled. If in function block 808, the system determines that the green LED has been enabled, then flow proceeds along the "Y" line to function block 812 where the system will turn on the green LED to indicate when the LCM 10 and all the associated DE breakers 40 are operating normally. If the green LED was not enabled in function block 808, then flow proceeds along the "N" to function block 814 where the system determines whether or not the red LED has been enabled. If in function block 814 the red LED has been enabled then flow proceeds along the "Y" line to function block 816 where the system acts to turn on the red LED and the audible alert or buzzer. The meaning of the red LED is that a DE breaker 40 has tripped and the flashing pattern of the LED transmits a coded message to indicate the nature of the problem that occurred at that particular DE breaker 40. Simultaneously, with the flashing of the red LED, the audible alarm or buzzer will also be activated to provide an audible alert that a problem exists with one of the DE breakers 40. Following the application of a bit in either function block 812, turning on the green LED, or in function block 816, turning on the red LED and the audible alert, the program then flows to function block 818 where the routine returns to the main program. Similarly, if in function block 814, the test to determine if the red LED was enabled is negative, flow then proceeds along the "N" line to the return function block at function block 818 where the audible and visible indicator routine returns to the main program.

Figure 9:
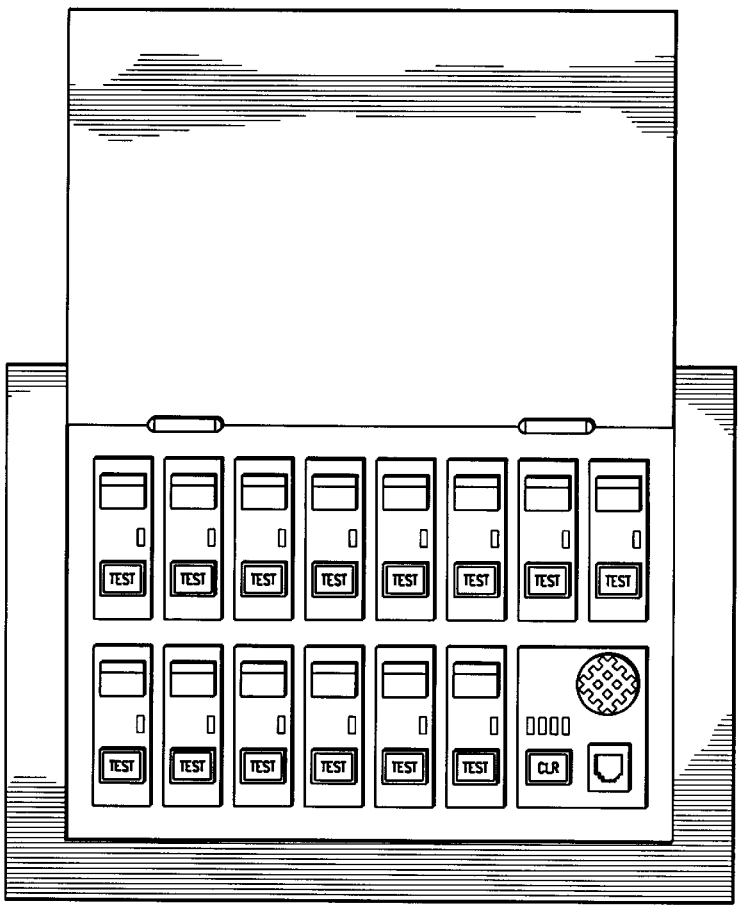
FIG. 9 illustrates a Load Center Monitor and circuit breaker installed in an electrical service panel.

Referring now to FIG. 9, there is illustrated a load center monitor 10 and circuit breaker 40 installed in an electrical service panel.

Figure 10:
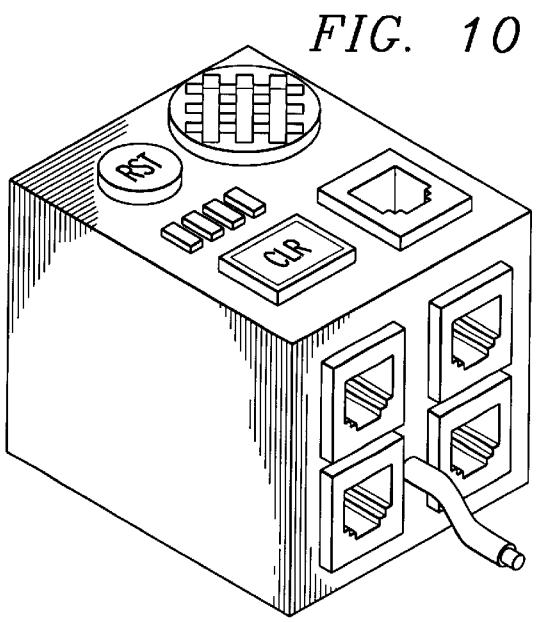
FIG. 10 illustrates a pictorial view of a Load Center Monitor depicting access buttons and communication ports.

Referring now to FIG. 10 there is illustrated a pictorial view of a load center monitor depicting access buttons and communication ports. The CLEAR and READ buttons, LED status indicators, the user communication port, the neutral pigtail lead, the communications port for connecting the monitor 10 to the breakers 40 in a system. A diagnostic port and a service port is also provided.

Figure 11:
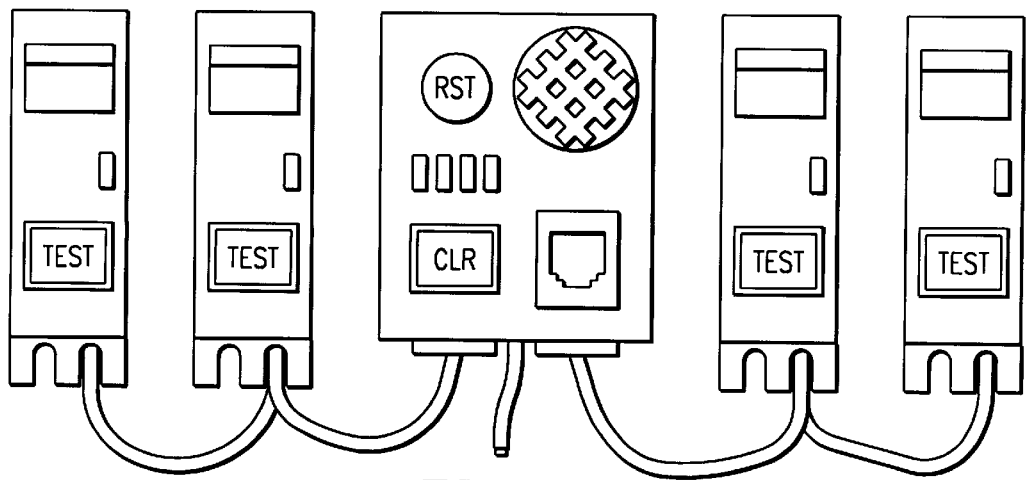
FIG. 11 illustrates a breaker system including a Load Center Monitor connected via the communication port to four breakers.

Referring now to FIG. 11, there is illustrated a breaker system including a Load Center Monitor connected via the communication port to four breakers 40.

Although the preferred embodiment has been described in detail, it should be understood that various changes, substitutions and alterations can be made therein without departing from the spirit and scope of the invention as defined by the appended claims.

What is claimed is:

1. A circuit breaker system, comprising:
a plurality of individual breakers, each having:
a controller for controlling the operation of said individual breaker,
a monitor for monitoring the operation of said individual breaker,
a historical memory for storing monitored information generated over time by said monitor, and
a breaker communication port for communicating with said historical memory;
a communication network for interfacing with the communication port of each of said plurality of breakers for communicating therewith; and
a central controller having:
a controller communication port for interfacing with said communication network,
a central memory for storing historical memory information associated with select ones of the individual breakers, and
a communication device for communicating through said controller communication port with a select one of said breakers and for accessing the contents of said associated historical memory and downloading historical data therefrom for storage in said central memory.

2. The circuit breaker system of claim 1 wherein said central controller further comprises time-keeping circuitry for stamping said downloaded historical data from said historical memory associated with the access of said select one of said breakers.

3. The circuit breaker system of claim 1 wherein each of said breakers further includes an operating parameter memory for storing operating parameters enabling said controller for said associated breaker to control the operation of said breaker in accordance with said stored operating parameters.

4. The circuit breaker system of claim 3 wherein said central controller is operable to interface with said parameter memory and operable to upload over said communication network through said central communication port and said associated breaker communication port new operating parameters such that said controller will control the operation of said associated breaker in accordance with new operating parameters.

5. The circuit breaker system of claim 4 wherein said central controller further comprises means for generating new operating parameters.

6. The circuit breaker system of claim 4 wherein said central controller further includes a processing unit, said processing unit operable to analyze said downloaded historical data from said select one of said circuit breakers in accordance with a predetermined algorithm and generate new updated operating parameters in response to said analysis and transfer said updated operating parameters to said select breaker for storage in said operating parameter memory.

7. The circuit breaker system of claim 6 wherein said processing system in said central controller is operable to analyze historical data from more than one of said circuit breakers and generate operating parameters based upon data from other circuit breakers that is not available for each of said individual breakers.

8. The circuit breaker system of claim 1, wherein said central memory is a non-volatile memory.

9. The circuit breaker system of claim 1, wherein each of said breakers is housed in a breaker package which is operable to be inserted into a main power panel.

10. The circuit breaker system of claim 9, wherein said central controller is also housed in a housing that is operable to be inserted into said main power panel.

11. The circuit breaker system of claim 10, wherein said central controller is powered from a main power line in said main power panel, each of said individual breakers operable to be likewise inserted into said main power panel.

12. The circuit breaker system of claim 1, wherein each of said plurality of breakers has associated therewith a unique address on the communication network wherein said central controller selectably communicates with a select one of said breakers by addressing said select breaker with its unique address on the bus.

13. The circuit breaker system of claim 12, wherein said central controller assigns said unique addresses to each of said breakers, wherein a new breaker added to said circuit breaker system will have a new address assigned thereto.

14. The circuit breaker system of claim 1, and further comprising a communication port for communicating between an external data and/or control source and said central controller, wherein said external data and/or control source can directly communicate with said central controller.

15. The circuit breaker system of claim 1, wherein said central controller further comprises means for generating an alarm indicative of determined conditions in the system and wherein said central controller further comprises means for determining conditions in the system for which alarms are to be generated.

16. The circuit breaker system of claim 15, wherein said central controller further includes a communication port for communicating an alarm condition determined by said means for determining to an external location.

17. The circuit breaker system of claim 16, wherein said central controller further includes means for performing an external operation in response to said means for determining that there is an alarm condition.

18. The circuit breaker system of claim 17, wherein said external operation comprises activating one of said breakers to disconnect power.

* * * * *